United States Patent
Sakhnini et al.

(10) Patent No.: US 12,295,064 B2
(45) Date of Patent: May 6, 2025

(54) MONITORING FOR PERIODIC SIGNALS DURING NON-UNIFORM DISCONTINUOUS RECEPTION CYCLES

(71) Applicant: QUALCOMM Incorporated, San Diego, CA (US)

(72) Inventors: Iyab Issam Sakhnini, San Diego, CA (US); Prashanth Haridas Hande, San Diego, CA (US); Hyun Yong Lee, San Diego, CA (US); Tao Luo, San Diego, CA (US); Wanshi Chen, San Diego, CA (US); Linhai He, San Diego, CA (US); Peter Gaal, San Diego, CA (US); Junyi Li, Fairless Hills, PA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/875,318

(22) Filed: Jul. 27, 2022

(65) Prior Publication Data
US 2024/0040660 A1 Feb. 1, 2024

(51) Int. Cl.
*H04W 76/28* (2018.01)
(52) U.S. Cl.
CPC .................................. *H04W 76/28* (2018.02)
(58) Field of Classification Search
CPC ............. H04W 76/28; H04W 52/0229; H04W 52/0235; H04W 52/0245; H04W 52/028; H04W 52/0216; H04W 72/0446; Y02D 30/70; H04L 5/0053
See application file for complete search history.

(56) References Cited

U.S. PATENT DOCUMENTS

2019/0116552 A1* 4/2019 Sebeni ................ H04W 72/23
2020/0389933 A1* 12/2020 Ang .................... H04W 52/0232
2022/0159617 A1* 5/2022 Shih .................... H04W 68/005

FOREIGN PATENT DOCUMENTS

WO  WO-2020253969 A1 * 12/2020
WO  WO-2022151321 A1    7/2022

OTHER PUBLICATIONS

International Search Report and Written Opinion—PCT/US2023/070314—ISA/EPO—Nov. 21, 2023 (2205041WO).

(Continued)

*Primary Examiner* — Thai Nguyen
(74) *Attorney, Agent, or Firm* — Holland & Hart LLP

(57) ABSTRACT

Methods, systems, and devices for wireless communications are described. For example, a network entity may output, and a user equipment (UE) may receive, a first control message identifying a first discontinuous reception (DRX) cycle and a second, different DRX cycle for the UE to use, the first and second DRX cycles having a first and second active duration, respectively. The network entity may also output a second control message identifying periodic resources for the UE to use to monitor for a periodic signal, the periodic resources being outside at least the first active duration. The UE may monitor for, and the network entity may output, based on the periodic resources being outside the first active duration, the periodic signal during the first active duration based on updating the first active duration, updating the periodic resources, or both.

27 Claims, 17 Drawing Sheets

(56) References Cited

OTHER PUBLICATIONS

Qualcomm Incorporated: "Power Saving Techniques for XR", 3GPP TSG RAN WG1 #109-e, R1-2205176 (revision of R1-2205054), 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, May 9, 2022, 28 Pages, XP052191816, p. 1, Para 2.1 p. 2, lines 9-10 p. 4, lines 17-18 p. 6, lines 13-17.

* cited by examiner

MONITORING FOR PERIODIC SIGNALS DURING NON-UNIFORM DISCONTINUOUS RECEPTION CYCLES

FIELD OF TECHNOLOGY

The following relates to wireless communications, including monitoring for periodic signals during non-uniform discontinuous reception (DRX) cycles.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support monitoring for periodic signals during non-uniform discontinuous reception (DRX) cycles. For example, the described techniques provide for a network entity and a user equipment (UE) altering one or more parameters of one or more connected mode DRX (C-DRX) configurations, one or more periodic signals, or both to accommodate one or more non-uniform C-DRX configurations. In some examples, a network entity may transmit a control message (e.g., via radio resource control (RRC) signaling) to a UE indicating a non-uniform (e.g., semi-static, non-integer periodic, or dynamic)C-DRX configuration. In some cases, the network entity may configure one or more periods of one or more periodic signals based on the non-uniform C-DRX configuration, or may transmit one or more dynamic indications to advance or delay one or more C-DRX cycles based on the non-uniform C-DRX configuration. In some examples, the network entity may transmit an indication, to the UE, of an implicit linkage between the C-DRX cycles in the C-DRX configuration and the one or more periodic signals. In some cases, the network entity may include a second C-DRX configuration (e.g., in the RRC signaling) configured based on the one or more periodic signals, or may configure a two-stage C-DRX configuration. In some examples, the network entity may indicate to the UE to extend one or more C-DRX active times based on the one or more periodic signals. In some cases, the UE may configure one or more C-DRX cycles or active times based on the one or more periodic signals, the non-uniform C-DRX configuration, or one or more indications from the network entity. In some cases, the UE may transmit an indication that the UE will not measure periodic signals that fall outside an active time. Additionally, or alternatively, the network entity may configure one or more periodicities and offsets of the periodic signals according to a continuous range of integers or according to a rational number. In some examples, the network entity or the UE may implement an updated timing reference value.

A method for wireless communication at a UE is described. The method may include receiving a first control message identifying a first DRX cycle for the UE to use and a second DRX cycle for the UE to use different than the first DRX cycle, the first DRX cycle having a first active duration and the second DRX cycle having a second active duration, receiving a second control message identifying periodic resources for the UE to use to monitor for a periodic signal, the periodic resources being outside at least the first active duration, and monitoring, based on the periodic resources being outside the first active duration, for the periodic signal during the first active duration based on updating the first active duration, updating the periodic resources, or both.

An apparatus for wireless communication at a UE is described. The apparatus may include a processor, memory coupled with the processor, and instructions stored in the memory. The instructions may be executable by the processor to cause the apparatus to receive a first control message identifying a first DRX cycle for the UE to use and a second DRX cycle for the UE to use different than the first DRX cycle, the first DRX cycle having a first active duration and the second DRX cycle having a second active duration, receive a second control message identifying periodic resources for the UE to use to monitor for a periodic signal, the periodic resources being outside at least the first active duration, and monitor, based on the periodic resources being outside the first active duration, for the periodic signal during the first active duration based on updating the first active duration, updating the periodic resources, or both.

Another apparatus for wireless communication at a UE is described. The apparatus may include means for receiving a first control message identifying a first DRX cycle for the UE to use and a second DRX cycle for the UE to use different than the first DRX cycle, the first DRX cycle having a first active duration and the second DRX cycle having a second active duration, means for receiving a second control message identifying periodic resources for the UE to use to monitor for a periodic signal, the periodic resources being outside at least the first active duration, and means for monitoring, based on the periodic resources being outside the first active duration, for the periodic signal during the first active duration based on updating the first active duration, updating the periodic resources, or both.

A non-transitory computer-readable medium storing code for wireless communication at a UE is described. The code may include instructions executable by a processor to receive a first control message identifying a first DRX cycle for the UE to use and a second DRX cycle for the UE to use different than the first DRX cycle, the first DRX cycle having a first active duration and the second DRX cycle having a second active duration, receive a second control message identifying periodic resources for the UE to use to monitor for a periodic signal, the periodic resources being outside at least the first active duration, and monitor, based on the periodic resources being outside the first active duration, for the periodic signal during the first active duration based on updating the first active duration, updating the periodic resources, or both.

Some examples of the method, apparatuses, and non-transitory computer-readable medium described herein may further include operations, features, means, or instructions for receiving an indication for the UE to update the periodic resources for the periodic signal to overlap the first active duration.

Some examples of the method, apparatuses, and non-transitory computer-readable medium described herein may further include operations, features, means, or instructions for receiving, according to a period derived from a fraction of two integers, one or more indications for updating the periodic resources, where the first control message may be received according to the period.

Some examples of the method, apparatuses, and non-transitory computer-readable medium described herein may further include operations, features, means, or instructions for receiving an indication for updating the periodic resources, where the indication may be received via the first control message and the first control message includes a wakeup signal (WUS), a downlink control information (DCI) message, a medium access control-control element (MAC-CE), or any combination thereof.

Some examples of the method, apparatuses, and non-transitory computer-readable medium described herein may further include operations, features, means, or instructions for receiving an indication of a relationship between the first DRX cycle and the periodic resources, where the relationship corresponds to a period of the periodic resources, a start time of the first DRX cycle, the first active duration, a time difference between the periodic resources and the first active duration, or any combination thereof and updating the first active duration, updating the periodic resources, or both in accordance with the relationship between the first DRX cycle and the periodic resources.

Some examples of the method, apparatuses, and non-transitory computer-readable medium described herein may further include operations, features, means, or instructions for receiving an indication of an update to the first active duration, where updating the first active duration includes starting a third active duration for the periodic resources in accordance with the indication or extending the first active duration for the periodic resources in accordance with the indication.

Some examples of the method, apparatuses, and non-transitory computer-readable medium described herein may further include operations, features, means, or instructions for receiving an indication to monitor during the first active duration and a third active duration, where the first DRX cycle may be a two-stage DRX cycle with the first active duration and the third active duration and updating the first active duration to include the first active duration and the third active duration.

Some examples of the method, apparatuses, and non-transitory computer-readable medium described herein may further include operations, features, means, or instructions for refraining from monitoring for the periodic signal during the second active duration based on the periodic resources being outside of the second active duration and transmitting an indication that the UE may be refraining from monitoring for the periodic signal to a network entity.

In some examples of the method, apparatuses, and non-transitory computer-readable medium described herein, the periodic resources for the UE to use to monitor for the periodic signal include one or more of a channel state information-reference signal (CSI-RS) resource, a search space set, a semi-persistent scheduling (SPS) resource, a configured grant (CG) resource, or a sounding reference signal (SRS) resource.

In some examples of the method, apparatuses, and non-transitory computer-readable medium described herein, the periodic resources correspond to a period associated with an integer value, one or more rational numbers, a timing reference value corresponding to a system frame number (SFN), or any combination thereof.

A method for wireless communication at a network entity is described. The method may include outputting a first control message identifying a first DRX cycle for one or more UEs to use and a second DRX cycle for the one or more UEs to use different than the first DRX cycle, the first DRX cycle having a first active duration and the second DRX cycle having a second active duration, outputting a second control message scheduling periodic resources for the one or more UEs to use to monitor for a periodic signal, the periodic resources being outside of at least the first active duration, and outputting, based on the periodic resources being outside the first active duration, the periodic signal during the first active duration based on updating the first active duration, updating the periodic resources, or both.

An apparatus for wireless communication at a network entity is described. The apparatus may include a processor, memory coupled with the processor, and instructions stored in the memory. The instructions may be executable by the processor to cause the apparatus to output a first control message identifying a first DRX cycle for one or more UEs to use and a second DRX cycle for the one or more UEs to use different than the first DRX cycle, the first DRX cycle having a first active duration and the second DRX cycle having a second active duration, output a second control message scheduling periodic resources for the one or more UEs to use to monitor for a periodic signal, the periodic resources being outside of at least the first active duration, and output, based on the periodic resources being outside the first active duration, the periodic signal during the first active duration based on updating the first active duration, updating the periodic resources, or both.

Another apparatus for wireless communication at a network entity is described. The apparatus may include means for outputting a first control message identifying a first DRX cycle for one or more user equipments (UEs) to use and a second DRX cycle for the one or more UEs to use different than the first DRX cycle, the first DRX cycle having a first active duration and the second DRX cycle having a second active duration, means for outputting a second control message scheduling periodic resources for the one or more UEs to use to monitor for a periodic signal, the periodic resources being outside of at least the first active duration, and means for outputting, based on the periodic resources being outside the first active duration, the periodic signal during the first active duration based on updating the first active duration, updating the periodic resources, or both.

A non-transitory computer-readable medium storing code for wireless communication at a network entity is described. The code may include instructions executable by a processor to output a first control message identifying a first DRX cycle for one or more UEs to use and a second DRX cycle for the one or more UEs to use different than the first DRX cycle, the first DRX cycle having a first active duration and the second DRX cycle having a second active duration, output a second control message scheduling periodic resources for the one or more UEs to use to monitor for a periodic signal, the periodic resources being outside of at least the first active duration, and output, based on the periodic resources being outside the first active duration, the periodic signal during the first active duration based on updating the first active duration, updating the periodic resources, or both.

In some examples of the method, apparatuses, and non-transitory computer-readable medium described herein, the updating the periodic resources may include operations, features, means, or instructions for outputting a third control message scheduling additional periodic resources for at least one UE of the one or more UEs, where the additional periodic resources may be different than the periodic resources.

Some examples of the method, apparatuses, and non-transitory computer-readable medium described herein may further include operations, features, means, or instructions for outputting an indication for at least one UE of the one or more UEs to update the periodic resources for the periodic signal to overlap the first active duration.

Some examples of the method, apparatuses, and non-transitory computer-readable medium described herein may further include operations, features, means, or instructions for outputting, according to a period derived from a fraction of two integers, one or more indications for updating the periodic resources, where the first control message may be output according to the period.

Some examples of the method, apparatuses, and non-transitory computer-readable medium described herein may further include operations, features, means, or instructions for outputting an indication for updating the periodic resources, where the indication may be output via the first control message and the first control message includes a WUS, a DCI message, a MAC-CE, or any combination thereof.

Some examples of the method, apparatuses, and non-transitory computer-readable medium described herein may further include operations, features, means, or instructions for outputting an indication of a relationship between the first DRX cycle and the periodic resources, where the relationship corresponds to a period of the periodic resources, a start time of the first DRX cycle, the first active duration, a time difference between the periodic resources and the first active duration, or any combination thereof.

Some examples of the method, apparatuses, and non-transitory computer-readable medium described herein may further include operations, features, means, or instructions for outputting an indication of an update to the first active duration, where the update to the first active duration includes starting a third active duration for the periodic resources in accordance with the indication or extending the first active duration for the periodic resources in accordance with the indication.

Some examples of the method, apparatuses, and non-transitory computer-readable medium described herein may further include operations, features, means, or instructions for outputting an indication to monitor during the first active duration and a third active duration, where the first DRX cycle may be a two-stage DRX cycle with the first active duration and the third active duration.

Some examples of the method, apparatuses, and non-transitory computer-readable medium described herein may further include operations, features, means, or instructions for obtaining an indication that at least one UE of the one or more UEs may be refraining from monitoring for the periodic signal.

In some examples of the method, apparatuses, and non-transitory computer-readable medium described herein, the periodic resources for the one or more UEs to use to monitor for the periodic signal include one or more of a CSI-RS resource, a search space set, a SPS resource, a CG resource, or a SRS resource.

In some examples of the method, apparatuses, and non-transitory computer-readable medium described herein, the periodic resources correspond to a period associated with an integer value, one or more rational numbers, a timing reference value corresponding to a SFN, or any combination thereof.

DETAILED DESCRIPTION

Figure 1:
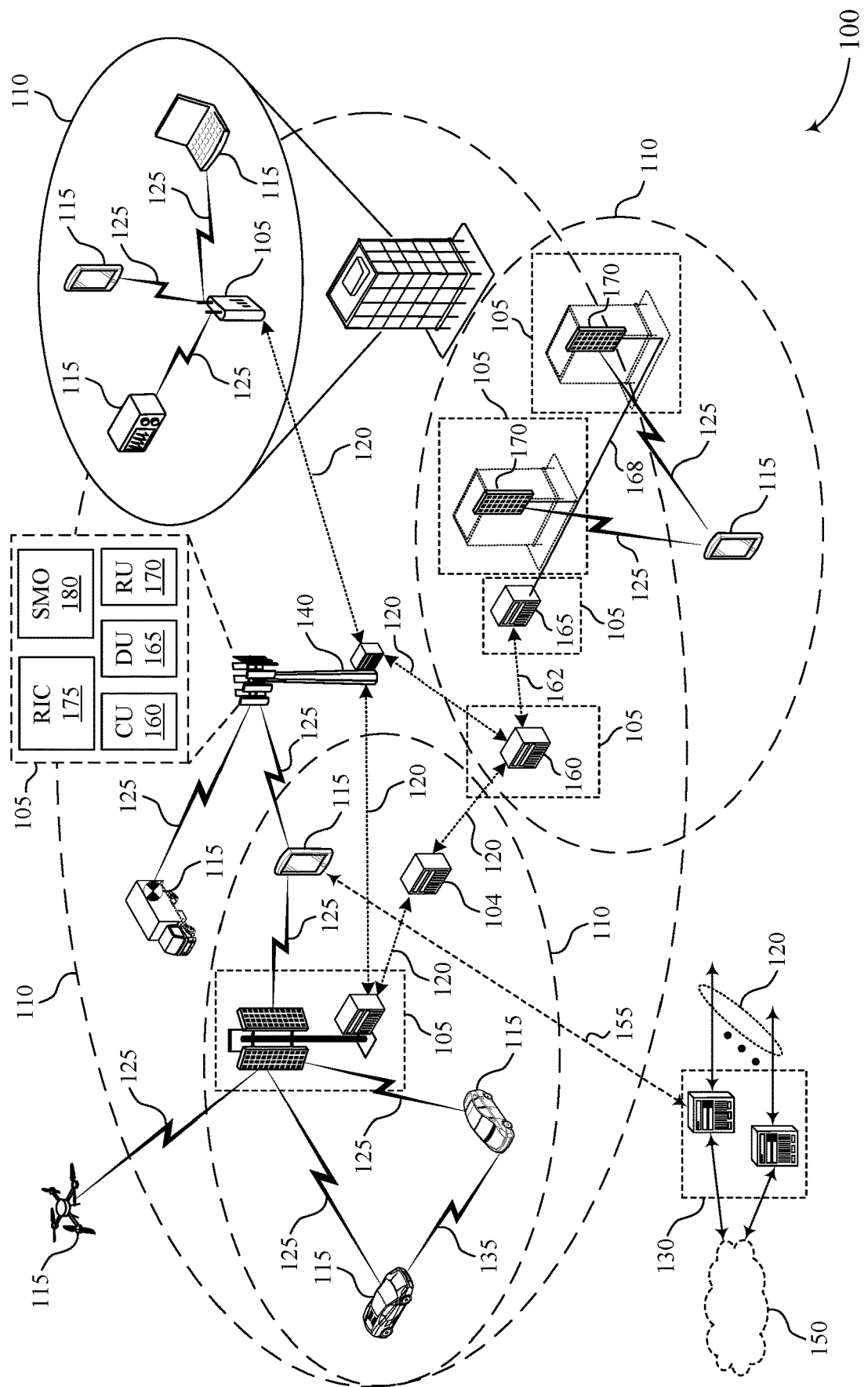
FIG. 1 illustrates an example of a wireless communications system that supports monitoring for periodic signals during non-uniform discontinuous reception (DRX) cycles in accordance with one or more aspects of the present disclosure.

Some wireless communications systems, such as an extended reality (XR) system, may have transmissions between a user equipment (UE) and a network entity that follow a somewhat uniform or periodic pattern. For example, XR applications may have traffic bursts that have a uniform or periodic pattern, where the XR applications may include cloud gaming applications, virtual reality (VR) split rendering applications, augmented reality (AR) split computation applications, and the like. Jitter and tempo mismatch in XR traffic bursts may cause various delays due to packet delay budget (PDB) violation or excessive power consumption in XR communications. In some cases, a network entity may configure a UE with non-uniform discontinuous reception (DRX) cycles, including non-uniform connected mode DRX (C-DRX) cycles (e.g., semi-statically or dynamically), to monitor for the XR traffic bursts, where the non-uniform C-DRX cycles may have varying active durations. The variation in active duration may reduce delays from jitter introduced in the XR communications due to delays in arrival of XR traffic from processing, interference, or other factors, or delays from tempo mismatch introduced due to a difference in periodicity between XR traffic and C-DRX cycles. However, using non-uniform C-DRX cycles or non-integer periods may cause one or more periodic signals or messages (e.g., search space sets, channel state information reference signals (CSI-RS), or the like) to fall outside of a C-DRX active time, which may cause further delays.

Techniques are described herein for enabling monitoring for periodic signals during non-uniform C-DRX cycles. For example, a network entity may receive one or more periodic transmissions based on one or more non-uniform C-DRX cycles. For example, the network entity may implicitly link the one or more periodic signals to the one or more non-uniform C-DRX cycles. Additionally, or alternatively, the network entity may configure the one or more periodic messages or signals according to a semi-static configuration or a non-integer period (e.g., fraction of two integers). The network entity may also transmit dynamic indications to edit one or more C-DRX cycles according to the periodic messages or signals, may transmit multiple C-DRX configurations, or may extend a C-DRX configuration accordingly. In some cases, the network entity may use a two-stage C-DRX cycle configuration. In some examples, the network entity may perform the processes described herein for shared signals in addition to, or in place of, transmitting one or more shared periodic signals, where the network entity may indicate a change in periodic signals to one or more UEs. In some cases, the UE may indicate to the network entity a pattern of skipping messages that fall outside one or more active times, and the network entity may refrain from configuring based on the indication, or send one or more periodic messages or signals based on the indication. In some cases, the C-DRX configuration(s) may include a set of predefined integers or fractions for one or more periodicities, or a new timing reference value for a system frame number.

Aspects of the disclosure are initially described in the context of wireless communications systems. Aspects of the disclosure are additionally described in the context of signaling diagrams and a process flow. Aspects of the disclosure are further illustrated by and described with reference to apparatus diagrams, system diagrams, and flowcharts that relate to monitoring for periodic signals during non-uniform DRX cycles.

FIG. 1 illustrates an example of a wireless communications system 100 that supports monitoring for periodic signals during non-uniform DRX cycles in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125.

The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support monitoring for periodic signals during non-uniform DRX cycles as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support XR devices. For example, a UE 115 may be an XR device, which may include a virtual reality (VR) device, an augmented reality device (AR), or a mixed reality (MR) device, where an MR device may include a combination of aspects from both VR devices and AR devices. In some cases, XR transmissions may have a low latency and may include delay-sensitive processes at a UE 115 (e.g., to improve quality of user experience). XR transmissions may also include high data throughput (e.g., high data rate) which may consume a large amount of power. For example, a network entity 105 may transmit large data packets, such as video frames, to a UE 115. Further, a UE 115 in some cases may be configured with a DRX configuration, such as a C-DRX configuration, in which the UE transitions to a power-saving sleep state between active times in which the UE monitors for communications from the network entity 105 (e.g., may monitor a physical downlink control channel (PDCCH) for one or more transmissions). In some examples, an active time may include an ON duration, may be extended by an inactivity timer, or both.

In some examples, XR communications may include one or more traffic bursts. For example, a network entity 105 may transmit one or more data packets in an XR traffic burst at the beginning of one or more C-DRX cycles in periodic transmissions. In some examples, each XR traffic burst may include variability in number and size of packets per burst. For example, one XR traffic burst at the beginning of a first C-DRX cycle may have three data packets of shorter lengths, whereas an XR traffic burst at the beginning of a second C-DRX cycle after the first cycle may have two data packets of larger lengths. In some cases, the XR traffic may be transmitted according to non-integer or integer periods. For example, the network entity 105 may transmit XR data at 1/60 frames per second (fps), with a 16.67 ms period, or at 1/120 fps, with a 8.33 ms period.

In some examples, jitter may be introduced in XR communications, causing arrival times of XR traffic to vary. For example, an XR traffic burst expected to arrive at the start of a C-DRX cycle may arrive late (e.g., 4 ms after the start of the C-DRX cycle). Additionally, or alternatively, jitter may cause an XR traffic burse to arrive before the start of a C-DRX cycle and within a previous C-DRX cycle (e.g., 4 ms before the start of the second C-DRX cycle). In some examples, jitter may be caused by processing at the network entity 105, interference, delays, and other factors. In some cases, the regular or periodic pattern of XR traffic may have a periodicity that does not correspond with an integer value of possible starting locations of C-DRX active times (e.g., starting time of C-DRX ON durations). For example, the C-DRX configuration may indicate an integer period (e.g., 16 ms), whereas the period of the XR traffic may have a non-integer period (e.g., 16.66 ms), causing a tempo mismatch, where the UE 115 and the XR traffic will be out of sync at one or more times.

XR traffic may include one or more data flows. For example, a network entity 105 may transmit two data flows. In some examples, each data flow may have different configurations. For example, each data flow may have a different period and other varying characteristics, and may be independent from one another. In some cases, a first data flow may carry video data, while a second data flow may carry audio data. By way of another example, for XR video data, the first data flow may carry video data for a left eye while the second data flow may carry video data for a right eye for an XR device.

In some cases, XR communications may include a small packet delay budget (PDB). For example, if a UE 115 misses reception of data for one or more video frames (e.g., due to delays in processing, jitter, or tempo mismatch), after an amount of time defined by the PDB, the UE 115 may discard data for one or more video frames after the PDB. In some cases, the network entity 105 may decide to not transmit data for one or more video frames after the time defined by the PDB. In some cases, violating a PDB may affect latency in communications, or may adversely affect user experience due to missing one or more video frames.

In some examples, fixed and periodic C-DRX parameters may have adverse effects on XR communications. For example, jitter and tempo mismatch may cause a PDB violation, where one or more packets arriving at a UE 115 may arrive outside a C-DRX active time (e.g., including a C-DRX ON duration) due to jitter and tempo mismatch, causing the UE 115 to miss reception of the one or more packets. Additionally, or alternatively, a C-DRX active time may not be long enough to accommodate the size of a traffic burst. In some cases, the network entity 105 may buffer one or more missed packets for transmission at a next C-DRX active time. However, the UE 115 may wait until the next C-DRX active time to receive the packets, and thus such delays may exceed the amount of time of a PDB. In some cases, fixed or periodic C-DRX parameters may cause unnecessary power waste as a fixed C-DRX ON duration or inactivity timer of a C-DRX active time may result in a UE 115 remaining active for a relatively long duration (e.g., longer than required for receiving one or more packets in an XR traffic burst).

In some cases, non-uniform cycle durations may provide C-DRX active times that are aligned with a periodicity of XR traffic. For example, one or more UEs 115 may be configured with C-DRX cycles within a C-DRX time period, such that different C-DRX cycles have non-uniform cycle durations within the C-DRX time period (e.g., using enhanced C-DRX (eC-DRX)), where a non-uniform cycle duration may be either semi-static or have a non-integer period (e.g., fraction). Such non-uniform cycle durations may thus provide C-DRX active times that are aligned with a periodicity (e.g., semi-static or fractional) of downlink traffic (e.g., XR downlink traffic) from a network entity 105 (e.g., a base station) to the UE 115. Additionally, or alternatively, the UE 115 or network entity 105 may dynamically change one or more C-DRX parameters to match XR traffic. For example, a network entity 105 may transmit one or more wakeup signals (WUS) or downlink control information (DCI) messages to dynamically update one or more C-DRX parameters (e.g., ON duration start, inactivity timer, or the like). In some cases, the network entity 105 may update the non-uniform C-DRX or dynamic C-DRX parameters to save power and avoid PDB violations at one or more wireless devices. However, the wireless devices may miss one or more periodic messages or signals. For example, due to the implementation of non-uniform C-DRX cycles or dynamic updates, one or more periodic messages, including search space sets, reference signals (e.g., CSI-RS), semi-persistent scheduling (SPS) or configured scheduling (CG) messages, and other messages, may fall outside a C-DRX active time (e.g., ON duration and inactivity timer), causing delays.

Techniques are described herein for aligning periodic signals or messages with non-uniform C-DRX cycles and dynamic messaging. For example, the wireless communications system 100 may support wireless devices monitoring for periodic signals during non-uniform DRX cycles. In the case of a non-uniform C-DRX configuration (e.g., semi-static, non-integer periodic, or dynamic C-DRX), a UE 115, a network entity 105, or both, may configure one or more periodic signals to align with the non-uniform C-DRX configuration as described with reference to FIGS. 2 and 3A. Additionally, or alternatively, a network entity 105 or UE 115 may adjust one or more parameters of a C-DRX configuration to accommodate reception of the periodic signals as described with reference to FIGS. 2 and 3B. In some cases, the network entity 105 or the UE 115 may adjust one or more periodic signals or C-DRX parameters for common signals as described with reference to FIGS. 2 and 3C. In some examples, the UE 115 may be configured with a two-stage C-DRX configuration, and the network entity 105 may transmit one or more periodic signals according to the two-stage C-DRX configuration as described with reference to FIG. 4. In some examples, the UE 115 may decide whether or not to measure the periodic signals when the periodic signals fall outside one or more C-DRX active times, and may transmit an indication of this decision to the network entity 105. In some examples, when using eC-DRX, the one or more periodic signals may include a periodicity and offset from a continuous range of periodicities and offsets. Additionally, or alternatively, the periodicity for the periodic signals may include one or more non-integer or rational numbers, including fractions (e.g., 50/3 ms). In some cases, a timing reference value may be updated to align the periodic signals with a non-uniform C-DRX cycle configuration.

Figure 2:
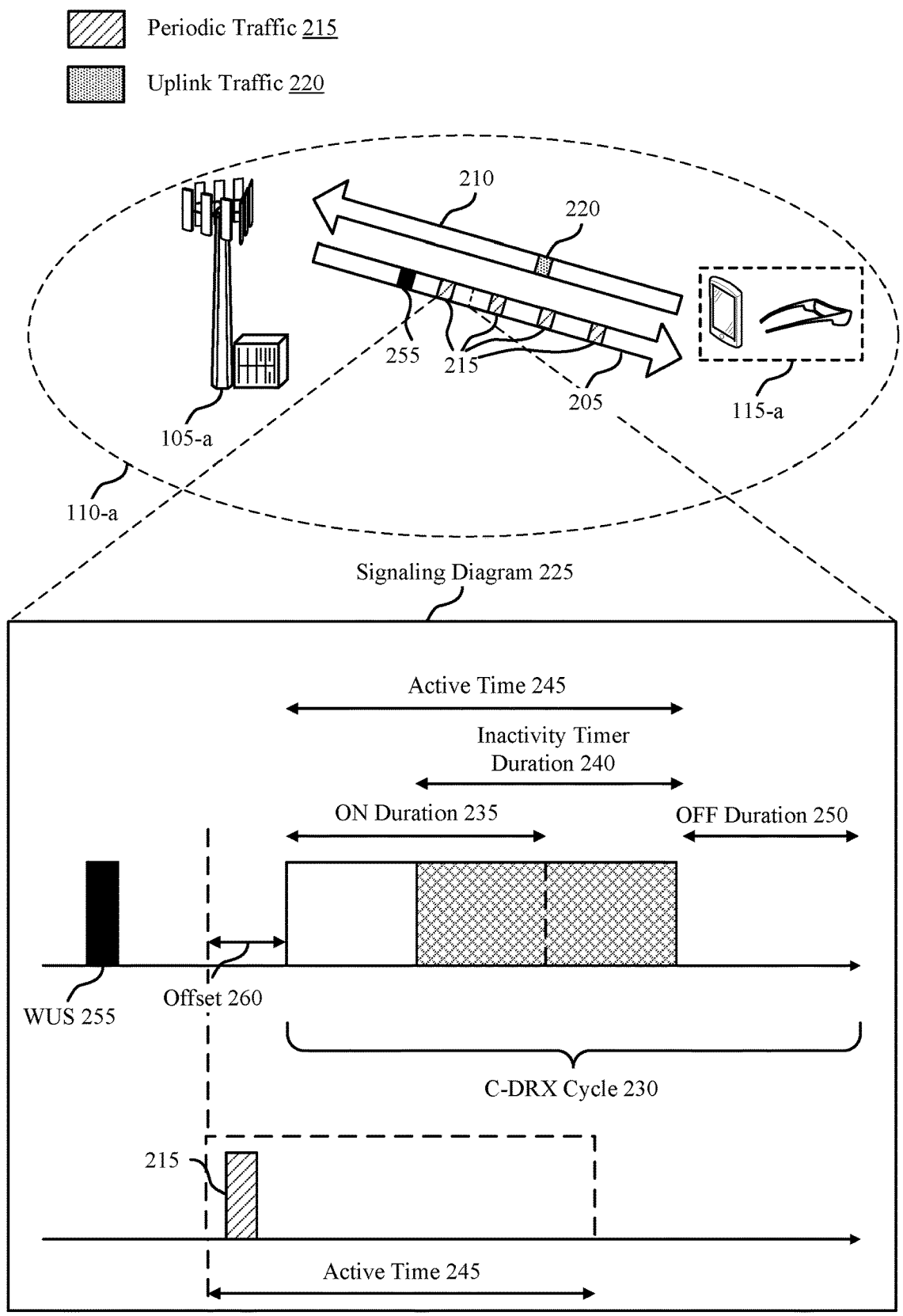
FIG. 2 illustrates an example of a wireless communications system that supports monitoring for periodic signals during non-uniform DRX cycles in accordance with one or more aspects of the present disclosure.

FIG. 2 illustrates an example of a wireless communications system 200 that supports monitoring for periodic signals during non-uniform DRX cycles in accordance with one or more aspects of the present disclosure. In some examples, the wireless communications system 200 may implement, or be implemented by, aspects of the wireless communications system 100. The wireless communications system 200 may include a network entity 105-a with a coverage area 110-a and a UE-115-a, which may represent examples of the network entities 105 with coverage areas 110 and the UEs 115 described with reference to FIG. 1. In some examples, the network entity 105-a may transmit control information, data, or both to the UE 115-a using a downlink communication link 205. For example, the network entity 105-a may transmit XR traffic as described with reference to FIG. 1, periodic traffic 215, or other messages. Similarly, the UE 115-a may transmit control information, data, or both to the network entity 105-a using an uplink communication link 210. For example, the UE 115-a may transmit uplink traffic 220. In some cases, the UE 115-a may represent an XR device as described with reference to FIG. 1.

In some examples, the network entity 105-a may transmit the periodic traffic 215 to the UE 115-a via the downlink communication link 205. In some cases, the periodic traffic 215 may include one or more reference signals, including CSI-RSs for beam management or UE mobility (or other purposes), synchronization signal blocks (SSB), tracking reference signals (TRS), sounding reference signals (SRS), or one or more other reference signals. Additionally, or alternatively, the periodic traffic 215 may include one or more search space sets, SPS messages, CG messages, or other periodic signals or messages.

In some examples, the UE 115-a may be configured with one or more C-DRX cycles as shown in signaling diagram 225 and as described with reference to FIG. 1. For example, the UE 115-a may include a C-DRX cycle 230. At the beginning of the C-DRX cycle 230, the UE 115-a may enter an ON duration 235, where the UE 115-a may monitor for receiving data, including the periodic traffic 215, XR traffic, or other data as described herein. In some examples, the UE 115-a may be configured with an inactivity timer duration 240 corresponding to activating an inactivity timer. For example, the UE 115-a may activate an inactivity timer after receiving data (e.g., based on a configuration at the UE 115-a) or an indication from the network entity 105-a, where the UE 115-a may remain active for the inactivity timer duration 240. In some cases, the duration including the ON duration 235 and the inactivity timer duration 240 may constitute an active time 245 for the UE 115-a, where the UE 115-a may monitor for and receive data during the active time 245. In some examples, the active time 245 may include the ON duration 235. For example, the UE 115-a may not receive data during the ON duration 235, and may not activate the inactivity timer. Thus, the active time 245 may have a same length as the ON duration 235. In some cases, the UE 115-a may include an OFF duration 250 immediately following the active time 245 for the remainder of the C-DRX cycle 230, where the sum of the active time 245 and the OFF duration 250 may fill the length of the C-DRX cycle 230. In some cases, the UE 115-a may be automatically configured (e.g., by a network entity 105-a) to enter the ON duration 235 at the beginning of every C-DRX cycle 230.

In some cases, the UE 115-a may transmit a report corresponding to the received periodic traffic 215. For example, the UE 115-a may transmit a CSI-RS report (e.g., in the uplink traffic 220 via the uplink communication link 210) after receiving a CSI-RS at the beginning of the C-DRX cycle 230. In some cases, the UE 115-a may be configured with a reception occasion at the beginning of each C-DRX cycle for receiving the periodic traffic 215, and may transmit a report according to the periodic traffic 215 received at the beginning of the C-DRX cycle 230, where the periodic traffic 215 may fall within the active time 245. In some cases, the network entity 105-a may transmit a WUS 255 to the UE 115-a to "wake up" the UE 115-a. For example, the UE 115-a may receive the WUS 255, and may transition to the ON duration 235 based on receiving the WUS 255. In some examples, the UE 115-a may include the inactivity timer duration 240 based on receiving the WUS 255. In some cases, the UE 115-a may enter the ON duration 235 and may not include the inactivity timer duration 240 if the UE 115-a is configured to receive WUSs, but does not receive the WUS 255. In some cases, the UE 115-a may refrain from transmitting a report for the periodic traffic 215 if the periodic traffic 215 falls outside of the active time 245 no later than a corresponding resource (e.g., CSI-RS resource).

In some examples, the UE 115-a may be configured with a non-uniform C-DRX configuration (e.g., semi-static, non-integer periodic, or dynamic C-DRX) to accommodate XR traffic, as described with reference to FIG. 1. For example, a period for one or more C-DRX cycles for the UE 115-a may be a fraction of two integers to match a non-integer XR traffic period, while one or more CSI-RS signals transmitted in the periodic traffic 215 may include an integer period between 4 and 640 slots. In some cases, the C-DRX cycles may be configured with a 1/60 ms, or 16.667 ms period, whereas the periodic CSI-RS signals may be transmitted with a period of 16 ms. The mismatched periods may cause the CSI-RS signals to fall out of sync with the non-integer C-DRX period over time and to fall outside of the active time 245 and be missed by the UE 115-a. However, the non-uniform C-DRX configuration may cause one or more periodic signals from the periodic traffic 215 to fall outside the active time 245.

By way of another example, the UE 115-a may be configured with a semi-static C-DRX configuration (e.g., eC-DRX), with cycle periods following a pattern of 16 ms, 17 ms, 17 ms, 16 ms, 17 ms, and 17 ms. The CSI-RS signals may have a period of 16 ms and may be transmitted at the beginning of each C-DRX period according to the 16 ms periods. However, after the first 17 ms period, the next C-DRX cycle 230 may have an offset 260 compared to the 16 ms period of the CSI-RS signals. In such an example, a CSI-RS signal (e.g., periodic traffic 215) may be transmitted before the beginning of the next C-DRX cycle 230, and may thus fall outside the active time 245. In another example, the UE 115-a may be configured to begin the C-DRX cycle 230 based on one or more dynamic indications to adapt to XR traffic, which may similarly cause the UE 115-a to miss the periodic traffic 215 if the UE 115-a enters the OFF duration 250 before the periodic traffic 215 is received. Thus, semi-static, non-integer periodic, and dynamic C-DRX may cause the UE 115-a to miss one or more periodic signals of the periodic traffic 215. This may cause measurement or reporting delays as the UE 115-a may wait until a next C-DRX cycle after the C-DRX cycle 230 based on missing the periodic traffic 215, which may also degrade performance.

In some examples, the wireless communications system 200 may support techniques monitoring for periodic signals during non-uniform DRX cycles as described with reference to FIG. 1. For example, in the case of a non-uniform C-DRX configuration (e.g., semi-static, non-integer periodic, or dynamic C-DRX), the UE 115-a, the network entity 105-a, or both, may adapt the periodic traffic 215 or C-DRX configuration (e.g., the C-DRX cycle 230) to avoid delays and performance degradation. In some examples, the network entity 105-a may adapt the period of the periodic traffic 215 to fall within the active time 245, may use dynamic indications to advance or delay the active time 245 (e.g., start time for the ON Duration 235), or may include implicit linkage between the periodic traffic 215 and the C-DRX configuration, as described in further detail with reference to FIG. 3A. Additionally, or alternatively, the UE 115-a may include multiple C-DRX configurations with different periods, or may extend a duration and start time of the active time 245, as described with reference to FIG. 3B. In some cases, the network entity 105-a may employ one or more changes to accommodate multiple UEs, as described with reference to FIG. 3C. In some examples, the UE 115-a may include one or more inner and outer cycle configurations, as described in further detail with reference to FIG. 4. In some examples, the network entity 105-a may configure the UE 115-a to adapt one or more C-DRX cycles to the periodic traffic 215, or the UE 115-a may receive one or more indications from the network entity 105-a indicating changes to the periodic traffic 215, as descried herein.

In some examples, the UE 115-a may decide whether or not to measure the periodic traffic 215 (e.g., one or more CSI-RSs) when the periodic traffic 215 falls outside of the active time 245. For example, the UE 115-a may be configured to remain in a sleep state during the OFF duration 250. In some cases, the UE 115-a may determine to wake up outside of the active time 245 (e.g., to receive one or more CSI-RSs that fall outside the active time 245 during the OFF duration 250). In some cases, the UE 115-a may indicate to the network entity 105-a that the UE 115-a may not measure the periodic traffic 215 if the periodic traffic 215 falls outside the active time 245. For example, if the UE 115-a determines to remain in a sleep state for a quantity of C-DRX cycles and to not measure the periodic traffic 215 when in the OFF duration 250, the UE 115-a may transmit the indication to the network entity 105-a. In some cases, the indication may be transmitted via PUCCH, PUSCH, or another channel, or may be transmitted in a MAC control element (MAC-CE), capability message (e.g., in RRC signaling), or other message using the uplink communication link 210. In some cases, the network entity 105-a may reduce an overhead by configuring the periodic traffic 215 to be sent inside of the active time 245 or the ON duration 235 based on the indication. In some cases, the UE 115-a and network entity 105-a may perform such decisions and indications during any of the processes described herein with respect to FIGS. 1-5.

Figure 3A:
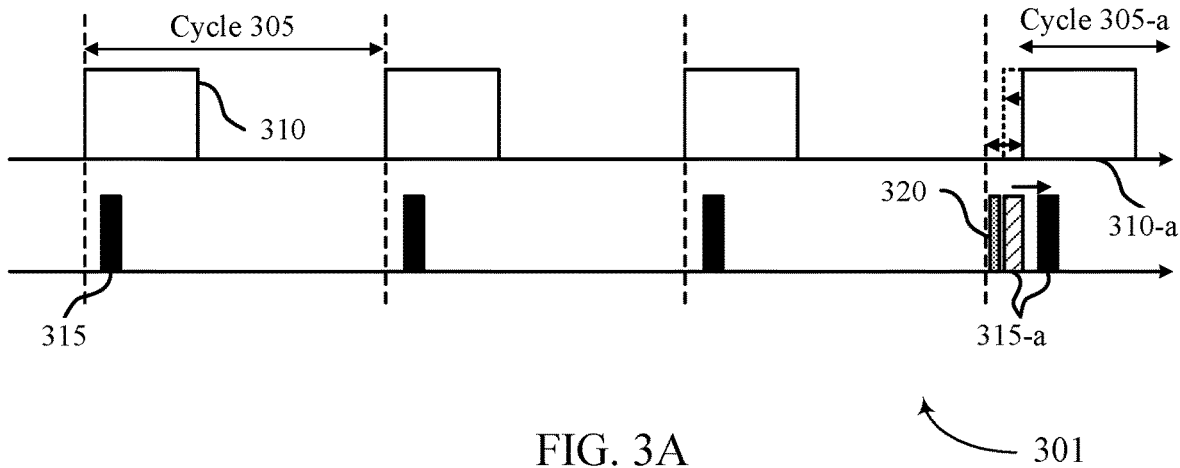
FIGS. 3A, 3B, and 3C illustrate examples of signaling diagrams that support monitoring for periodic signals during non-uniform DRX cycles in accordance with one or more aspects of the present disclosure.

In some examples, the periodic traffic 215 may include a periodicity and offset from a continuous range of periodicities and offsets (e.g., when using eC-DRX in the signaling diagram 301 described in FIG. 3A). For example, in some cases, the periodicity of the periodic traffic 215 may include 4, 5, 8, 10, 16, 20, 32, 40, 64, 80, 160, 320, or 640 slots. In some cases, the network entity 105-a may expand periodicities and slots for the periodic traffic 215 (e.g., for CSI-RSs, SRSs, or other reference signals), where the periodicities and slots may include integers from a continuous range of slot values from 0 to 640 slots. In some cases, a periodicity or offset associated with the periodic traffic 215 may include any integer value. Additionally, or alternatively, the periodicity for the periodic traffic 215 (e.g., for CSI-RSs, SRSs, or other reference signals), may include one or more rational or non-integer numbers, such as fractions of two integers (e.g., 50/3 ms). In some cases, the network entity 105-a may configure the periodic traffic 215 accordingly during any of the processes described herein with respect to FIGS. 1-5.

In some examples, a timing reference value may be updated to align the periodic traffic 215 with a non-uniform C-DRX cycle configuration. For example, the periodic traffic 215 may include one or more CSI-RSs, SRSs, or other reference signals, where the periodic traffic 215 may be configured (e.g., by the network entity 105 or preconfigured) according to an SFN and a subframe number, which may define corresponding slots. An SFN may include any integer in the range of 0 and 1023 frames, where the subframe number may include any integer in the range of 0 and 9 frames. CSI-RSs and SRSs may be configured according to a reference time of [(SFN×10)+sub frame number], which may be repeated every 10,240 ms, where 10,240 ms may constitute a hyper frame period. In some cases, the hyper frame period of 10,240 ms may not align with a non-uniform period as the hyper frame period is periodic, which may lead to a CSI-RS falling out of sync with a non-uniform C-DRX cycle as described herein. For example, for 60 fps, a 0.6 frame period of XR traffic may remain at the end of the hyper frame (e.g., when the SFN returns to the integer 0), and for 120 fps, a 0.2 frame period of XR traffic may remain at the end of the hyper frame. The partial frame may cause a mismatch between periodic CSI-RSs and SRSs and the XR downlink frame arrival with the partial frame. In some cases, if a non-uniform C-DRX cycle is configured to match the XR downlink frame arrival, the UE 115-a may miss one or more CSI-RSs or SRSs.

To mitigate mismatch based on partial frames, the network entity 105-a may implement a timing reference value of $SFN_M$ which may be updated so that $SFN_M=[(SFN_M+1) \% M]$, where % may represent the modulo operator. Thus, $SFN_M$ may be updated accordingly when SFN changes (e.g., due to an increment in time). In some cases, M may represent a modulo number, and may be configured as 1000 for XR applications to accommodate non-uniform traffic and corresponding C-DRX configurations. For example, $SFN_M$ may be configured accordingly as an integer between 0 and 999 frames, and the corresponding subframe number may be any integer between 0 and 9. Thus, the new DRX reference time of $[(SFN_M \times 10)+\text{sub frame number}]$ may repeat every 10,000 ms, allowing C-DRX cycles to align with the non-uniform XR periodicity, as well as the reception of CSI-RSs and SRSs, due to the lack of partial frames at the end of the hyper frame period for $SFN_M$. In some cases, the network entity 105-a may configure the periodic traffic 215 accordingly during any of the processes described herein with respect to FIGS. 1-5.

In some examples, the techniques described herein with respect to FIGS. 1-5 may be employed to enhance C-DRX configurations and PDCCH monitoring to improve power saving in XR communications. Additionally, or alternatively, the techniques described herein may be employed to improve efficient resource allocation and scheduling for XR service, including enhancements to SPS, CG, and dynamic scheduling and grants. For example, the techniques described herein may lower jitter, lower latency, and improve reliability for multiple flows by enhancing periodicity or other characteristics of the periodic traffic 215 or one or more C-DRX configurations.

Figure 3B:
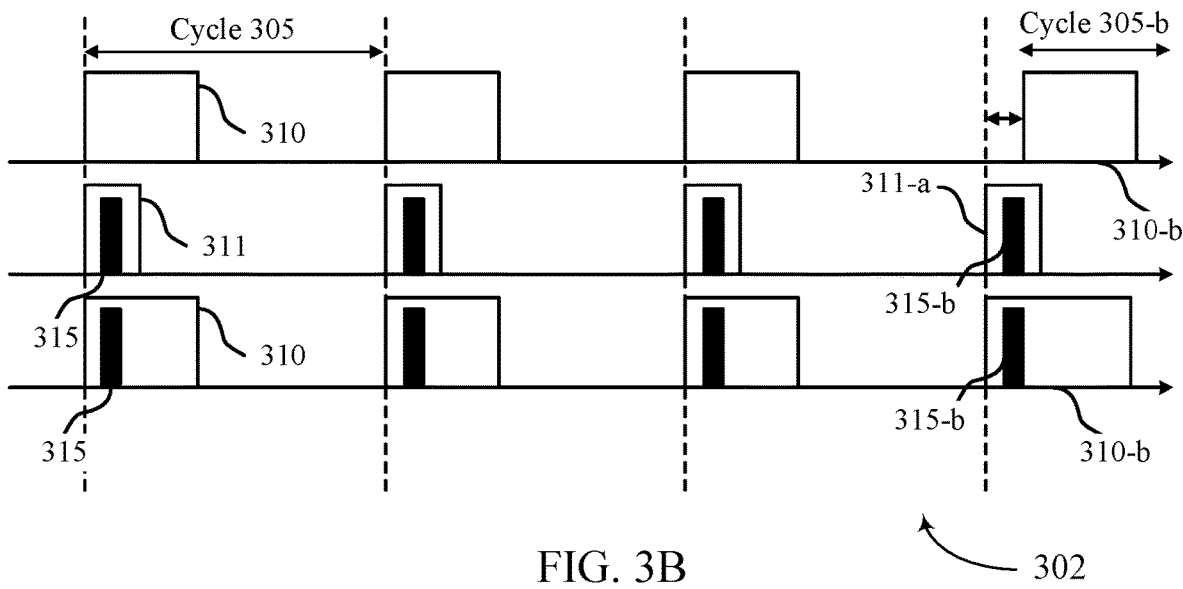
Figure 3C:
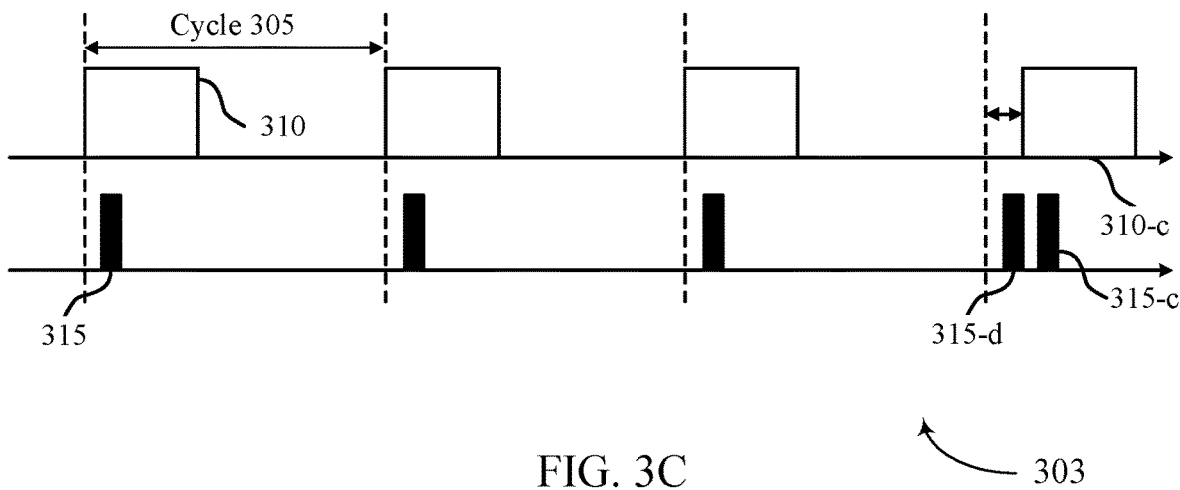

FIGS. 3A, 3B, and 3C may illustrate different examples of signaling diagrams 301, 302, and 303, respectively, that support monitoring for periodic signals during non-uniform DRX cycles in accordance with one or more aspects of the present disclosure. The signaling diagrams 301, 302, and 303 may represent signaling between a network entity 105 and a UE 115 according to one or more periodic signals (e.g., periodic messages) aligned with one or more C-DRX configurations as described with reference to FIGS. 1 and 2.

The signaling diagram 301 of FIG. 3A may represent one or more configurations and signaling for adapting periodic traffic, dynamic indications, or implicit signaling so that the periodic traffic falls within a C-DRX active time. For example, the signaling diagram 301 may include multiple C-DRX cycles 305, where a C-DRX active time 310 may begin at the start of each cycle 305. In some cases, the C-DRX active times 310 may represent a C-DRX ON duration, or a C-DRX ON duration and an inactivity timer duration as described with reference to FIG. 2. The signaling diagram 301 may also include one or more periodic signals 315.

In some examples, a network entity 105 may configure one or more periodic signals 315 (e.g., periodic messages) with one or more semi-static periods to match a non-uniform, semi-static C-DRX configuration. For example, the network entity 105 may configure the one or more periodic signals 315 (e.g., one or more CSI-RSs) to transmit at a period of 16 ms, 17 ms, 17 ms, repeating to match equal periods of an eC-DRX configuration matching XR traffic. The eC-DRX configuration may have one or more cycles 305, where the first cycle 305 may have a period of 16 ms, the second cycle 305 may have a period of 17 ms, and the third cycle 305 may have a period of 17 ms as well. Additionally, or alternatively, the network entity 105 may configure the one or more periodic signals 315 with a non-integer period including a fraction of two integers (e.g., 50/3 ms) to match a non-integer period of a C-DRX configuration, where a period of the cycles 305 may include a fraction (e.g., 50/3 ms). In some cases, the network entity 105 may derive the period for the periodic signals 315-$a$ based on an equation. For example, the network entity 105 may derive a period for each cycle 305 based on an equation, and may round to a nearest integer (rounding up or down) if the result is a non-integer period.

In some examples, the network entity 105 may transmit an indication (e.g., via RRC, DCI, or other signaling) of the updated period of the periodic signals 315 to the UE 115. In some cases, the network entity 105 may configure each type of periodic signal with a separate configuration to define each new period configuration. For example, the network entity 105 may include a CSI-RS configuration, an SRS configuration, an SSB configuration, a search space configuration, an SPS/CG configuration, a TRS configuration, etc. In some examples, the one or more periodic signals 315 may fall within each active time 310 based on the configurations and signaling described in the signaling diagram 301.

In some examples, the network entity 105 may use dynamic indications to advance or delay the active times 310. For example, based on jitter, tempo mismatch, a semi-static configuration, or non-integer periods, the active time 310-$a$ and a cycle 305-$a$ may be delayed compared to an integer periodic configuration, causing a periodic signal 315-$a$ to fall outside the active time 310-$a$. Based on the periodic signal 315-$a$ falling outside the active time 310-$a$, the network entity 105 may transmit a dynamic indication 320 to the UE 115. For example, the dynamic indication 320 may be a WUS. Based on the indication, the UE 115 may transition to an active state for the active time 310-$a$ at an earlier time before the network entity 105 transmits the periodic signal 315-$a$, so that the periodic signal 315-$a$ falls within the active time 310-$a$ and is successfully received at the UE 115. By way of another example, the network entity 105 may transmit a dynamic indication to delay the active time 310-$a$ if the periodic signal 315-$a$ is scheduled to arrive at a time after the end of the active time 310-$a$. For example, the network entity 105 may transmit the dynamic indication 320 in a DCI or MAC-CE to indicate the delay based on determining that the periodic signal 315-$a$ will fall outside of the active time 310-$a$. In some cases, the dynamic indication 320 may indicate the period of the periodic signals 315, and the UE 115 may determine based on the period of the periodic signals 315 and the cycles 305 that the periodic signal 315-$a$ will be received before or after the active time 310-$a$, and may adjust the active time 310-$a$ accordingly. In some cases, the network entity 105 may transmit a dynamic indication 320 for every instance that a periodic signal 315 falls outside an active time 310. In some cases, the dynamic indication 320 may indicate advancing or delaying multiple cycles 305 for multiple periodic signals 315.

In some examples, the network entity 105 may include implicit linkage between the periodic signals 315 and a C-DRX configuration for a UE 115. For example, the network entity 105 may configure one or more parameters of a configuration for the periodic signals 315 based on the C-DRX configuration for the active times 310 and cycles 305 so that the periodic signals 315 fall within each active time 310. In some cases, the network entity 105 may configure the implicit linkage based on one or more periods of the C-DRX configuration, dynamic indications, start times of the active times 310 (or ON durations for the active times 310) and the cycles 305, lengths and other parameters of the active times 310 (e.g., for ON durations or inactivity timers of the active times 310), or other parameters related to the periodic signals 315 and the C-DRX configuration. For example, the network entity 105 may configure the cycle 305-$a$ and the active time 310-$a$ to begin after a delay based on a non-uniform semi-static period or dynamic indication. Based on implicit linkage, the periodic signal 315-$a$ may be delayed according to the delayed cycle 305-$a$ and active time 310-$a$ so that the periodic signal 315-$a$ falls within the active time 310-$a$ regardless of the configuration of the cycle 305-$a$ and the active time 310-$a$. In some cases, a special delta may be configured for the C-DRX configuration and the configuration for the periodic signals 315.

The signaling diagram 302 of FIG. 3B may represent multiple C-DRX configurations with different periods or extending a C-DRX active time based on one or more periodic signals or messages falling outside the active time. For example, the signaling diagram 302 may include multiple C-DRX cycles 305 and one or more active times 310 as described with reference to FIG. 3A. The signaling diagram 302 may also include multiple active times 311. In some cases, the active times 310 and 311 may represent C-DRX ON durations, or a C-DRX ON durations and inactivity timer durations, as described with reference to FIG. 2. The signaling diagram 301 may also include one or more periodic signals 315.

In some examples, a network entity 105 may configure the active times 310 and the active times 311 with different periodicities. For example, the network entity 105 may include the active times 310 in a first non-uniform semi-static C-DRX configuration, as described with reference to FIG. 3A, where the active times 310 may be configured with a first duration. In some examples, a cycle 305 before a cycle 305-b may include a longer period than other cycles 305, resulting in an offset or delay before an active time 310-b. In some cases, the first configuration may be configured to accommodate non-uniform XR traffic. The network entity 105 may also include the active times 311 in a second periodic C-DRX configuration, where the active times 311 may be configured with a second duration. In some examples, the active times 311 may be configured based on the period, or one or more other parameters, of the periodic signals 315 so that the periodic signals 315 fall within the active times 311.

In some examples, a UE 115 may transition to an active state during both the active times 310 for the first C-DRX configuration and during the active times 311 for the second C-DRX configuration. For example, the UE 115 may transition to an active state based on a union of the durations and timing of both C-DRX configurations. In some cases, the UE 115 may transition to an active state to monitor for receptions at the beginning of an active time 311-a, and may remain in the active state until the end of an active time 310-a. Based on the union of the active times 310-b and 311-a, the UE 115 may be in an active state to receive non-uniform XR traffic (e.g., during the active time 310-b), as well as to receive the periodic signals 315 (e.g., CSI-RSs), including a periodic signal 315-b. In some examples, the network entity 105 may transmit both the first and the second C-DRX configuration to the UE 115 (e.g., in an RRC message). In some examples, the UE 115 may monitor according to the first C-DRX configuration, the second C-DRX configuration, or both. In some cases, the network entity 105 may indicate to the UE 115 to perform a union of both C-DRX configurations (e.g., may indicate in the same RRC message). In some examples, the UE 115 may be preconfigured to union two C-DRX configurations.

By way of another example, the UE 115 may adapt a length of a C-DRX active time to accommodate the periodic signals 315. For example, the UE 115 may be configured with the first C-DRX configuration and the active times 310 as described herein. Based on receiving a periodic signal outside of the active time 310-b, the UE 115 may extend a duration of the corresponding active time 310-b. For example, the UE 115 may extend the active time 310-b to include the corresponding delay, including the time where the periodic signal 315-b is received. In some examples, the network entity 105 may indicate to the UE 115 (e.g., via DCI, RRC, or L1 signaling) that the periodic signal 315-b will fall outside the range of the active time 310-b, in which case the UE 115 may respond by extending the duration of the active time 310-b. In some examples, the network entity 105 may configure the UE 115 to extend the duration of active times 310 based on a period or other characteristic of the periodic signals 315 (e.g., indicated in an RRC configuration including the C-DRX configuration), or based on dynamic indications from the network entity 105. In some examples, the UE 115 may indicate to the network entity 105 whether or not extending active times is supported at the UE 115 or not. In some examples, the UE 115 may be preconfigured to extend C-DRX active times based on the periodic signals 315 falling outside the active time 310-b.

The signaling diagram 303 of FIG. 3C may represent one or more changes to signaling or C-DRX configurations to accommodate multiple UEs 115. For example, the signaling diagram 303 may include multiple C-DRX cycles 305 and one or more active times 310 as described with reference to FIGS. 3A and 3B. In some cases, the active times 310 may represent C-DRX ON durations, or C-DRX ON durations and inactivity timer durations as described with reference to FIG. 2. The signaling diagram 303 may also include one or more periodic signals 315.

In some examples, a network entity 105 may transmit one or more periodic signals 315 to multiple UEs 115, where the periodic signals 315 may include one or more common messages. For example, the network entity 105 may transmit one or more common search space (CSS) signals, shared CSI-RS, TRS, or other shared periodic messages to one or more UEs 115. In some examples, each UE 115 may have a separate C-DRX configuration, where the C-DRX configuration may be a periodic configuration, or may be non-uniform semi-static, have a non-integer period, or may be adapted based on dynamic signaling as described herein with reference to FIGS. 1, 2, 3A, and 3B. In some cases, one or more UEs 115 may have different C-DRX configurations, C-DRX cycle periods, and other different factors in comparison to each other, while the UEs 115 may receive the one or more same shared periodic signals 315. In some cases, adapting the periodic signals 315, one or more C-DRX configurations including the active times 310, or a combination thereof as described herein may affect one or more UEs 115 differently based on the different configurations.

In some cases, the network entity 105 may adapt the one or more periodic signals 315, or the network entity 105 or the UE 115 may adapt a C-DRX configuration and one or more active times 310, for one or more UEs 115 configured with non-uniform C-DRX cycles, while refraining from adapting the periodic signals 315 or active times 310 and corresponding C-DRX configurations for one or more UEs 115 configured with uniform (e.g., integer periodic)C-DRX cycles. For example, one or more XR UEs 115 may receive configurations, signaling, or other messages to adapt corresponding active times 310 for a C-DRX configuration at the XR UE 115 based on the methods described with reference to FIGS. 3A and 3B. Thus, an active time 310-c may be adapted so that an XR UE 115 may receive a periodic signal 315-c that would otherwise fall outside the active time 310-c. The network entity 105 however may refrain from configuring one or more periodic UEs 115, or one or more UEs 115 with non-uniform C-DRX configurations different from the XR UEs 115, according to methods described with reference to FIGS. 3A and 3B. For example, the network entity 105 may refrain from adapting the active times 310 or C-DRX configurations of the periodic UEs 115 or different UEs 115 to match the periodic signals 315.

By way of another example, the network entity 105 may apply the methods described with reference to FIGS. 3A and 3B in parallel to transmitting one or more previously or differently configured periodic signals and channels. For example, the network entity 105 may transmit one or more periodic signals 315 (including shared periodic signals), including a periodic signal 315-d, to all UEs 115 (e.g., may broadcast one or more shared messages). In addition to the periodic signals 315, the network entity 105 may also transmit additional copies of the periodic signals 315, including a periodic signal 315-c, where the additional copies of the periodic signals 315 may be configured according to the methods described with reference to FIGS. 3A and 3B. In some examples, the network entity 105 may receive an indication from an XR UE 115 indicating, or may determine based on mismatch between the periodic signals 315 and one or more C-DRX configurations, to advance or delay a periodic signal 315 (e.g., a CSS). In response to the indication from the UE 115 or the decision at the network entity 105, the network entity 105 may transmit the original periodic signal 315-*d*, and may transmit an additional copy of the periodic signal 315-*d* as the periodic signal 315-*c* at a previous or later time. By employing the use of additional resources (e.g., the additional copies of the periodic signals 315), the network entity 105 may transmit periodic signals 315 that may be received by both periodic UEs 115 and non-uniform UEs 115 (e.g., the XR UEs 115). In some examples, the network entity 105 may transmit additional periodic signals 315 or indications to periodic UEs 115 as described herein while employing a two-stage C-DRX cycle configuration as described with reference to FIG. 4.

In some examples, the network entity 105 may transmit an indication of one or more changes to the periodic signals 315. For example, the network entity 105 may transmit an indication to one or more periodic UEs 115 indicating that the network entity 105 has changed one or more parameters of the periodic signals 315 according to one or more methods described with reference to FIGS. 3A and 3B. The one or more periodic UEs 115 may respond to the indication by adjusting one or more parameters to accommodate the change in the periodic signals 315, or may ignore the indication. In some examples, the network entity 105 may include the indication in a dynamic indication (e.g., DCI, MAC-CE, or other downlink message). In some examples, the network entity 105 may perform one or more procedures as described with reference to FIGS. 3A and 3B without transmitting additional periodic signals 315, without informing periodic UEs 115 of changes to the periodic signals 315, or both. In some examples, a UE 115 may indicate other capabilities of supporting one or more procedures described with reference to FIGS. 3A, 3B, and 3C. In some examples, the UE 115 may be preconfigured to perform one or more operations described herein with respect to FIGS. 3A, 3B, and 3C.

Figure 4:
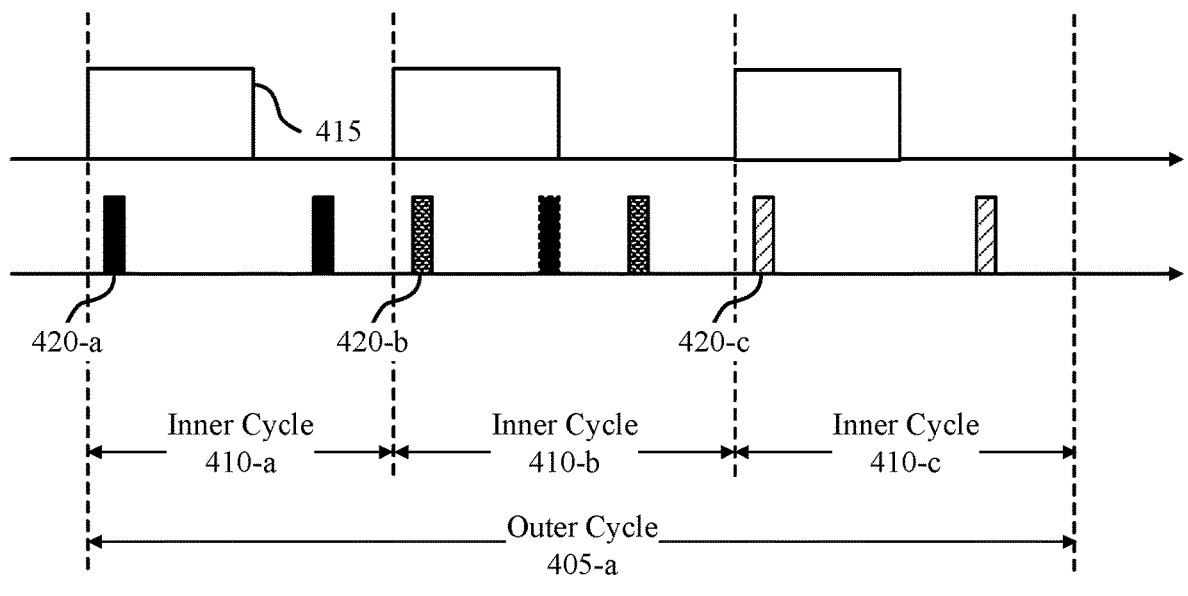
FIG. 4 illustrates an example of a signaling diagram that supports monitoring for periodic signals during non-uniform DRX cycles in accordance with one or more aspects of the present disclosure.

FIG. 4 illustrates an example of a signaling diagram 400 that supports monitoring for periodic signals during non-uniform DRX cycles in accordance with one or more aspects of the present disclosure. The signaling diagram 400 may represent signaling between a network entity 105 and a UE 115 according to one or more periodic signals (e.g., periodic messages) aligned with one or more C-DRX configurations as described with reference to FIGS. 1, 2, and 3A-3C. In some examples, the signaling diagram 400 may represent a two-stage cycle configuration for C-DRX for a UE 115, including one or more outer cycles 405 and one or more inner cycles 410. The C-DRX configuration may additionally include one or more active times 415, which may represent one or more active times (e.g., including ON durations, inactivity timer durations, or both) as described with reference to FIGS. 1, 2, and 3A-3C. The network entity 105 may additionally transmit one or more periodic signals 420 to the UE 115, which may represent one or more periodic signals or messages as described with reference to FIGS. 1, 2, and 3A-3C.

In some examples, the two-stage C-DRX configuration may include three inner cycles 410 in each outer cycle 405, including inner cycles 410-*a*, 410-*b*, and 410-*c* in an outer cycle 405-*a*. In some cases, each inner cycle 410 may have a separate period. For example, the inner cycle 410-*a* may have a period of 16 ms, the inner cycle 410-*b* may have a period of 17 ms, and the inner cycle 410-*c* may have a period of 17 ms. The outer cycle 405-*a* may include a period that constitutes a sum of the periods of the inner cycles 410 within the outer cycle 405-*a*. For example, the outer cycle 405-*a* may include a period of 16 ms+17 ms+17 ms=50 ms. In some cases, each inner cycle 410 may include a number of slots.

In some cases, the network entity 105 may transmit one or more periodic signals 420 based on the two-stage cycle configuration for C-DRX configured at the UE 115. For example, a periodic signal 420-*a* may be transmitted in a $0^{th}$ slot of the inner cycle 410-*a*, whereas a second periodic signal 420-*a* may be transmitted in a 20th slot of the inner cycle 410-*a*, where the two periodic signals 420-*a* may be transmitted at a periodicity of 10 ms (e.g., may be 10 ms apart). In some cases, the periodic signals 420 may be specific to each inner cycle 410. For example, the network entity 105 may transmit the periodic signals 420-*a* every 10 ms during the duration of the inner cycle 410-*a*. At the commencement of the inner cycle 410-*b*, the network entity 105 may cease transmitting the periodic signals 420-*a*, and may begin transmitting one or more periodic signals 420-*b*, starting at a slot 0 for the inner cycle 410-*b*. For example, the network entity 105 may refrain from transmitting another periodic signal 420-*a* 10 ms following the last periodic signal 420-*a* of the inner cycle 410-*a* based on beginning a new periodic transmission configuration at the start of the inner cycle 410-*b*. The network entity 105 may similarly cease transmission according to the inner cycle 410-*b* at the begging of the inner cycle 410-*c*, and may similarly transmit one or more periodic signals 420-*c* during the inner cycle 410-*c* (e.g., 10 ms apart).

In some cases, the network entity 105 may transmit a greater or lesser amount of periodic signals 420 during each inner cycle 410 based on a determination or configuration. In some cases, the UE 115 may monitor for the periodic signals 420 based on the C-DRX configuration, where the network entity 105 may indicate the C-DRX configuration. In some cases, the UE 115 may transmit a message (e.g., a capability message) to the network entity 105 indicating the two-stage C-DRX configuration. In some examples, the UE 115 may transmit a capability message to the network entity 105 indicating a capability of the UE 115 to support the two-stage C-DRX configuration, where the network entity 105 may transmit the two-stage C-DRX configuration to the UE 115 based on receiving the capability message. In some cases, the network entity 105 may transmit the one or more periodic signals 420 (e.g., one or more CSI-RSs) at a periodicity of 10 ms, 20 ms, 40 ms, or another periodicity.

In some examples, transmitting the periodic signals 420 according to the two-stage configuration may align the periodic signals 420 with the inner cycles 410 regardless of whether the C-DRX configuration at the UE 115 is periodic or non-uniform. For example, a periodic signal 420 may be transmitted at the beginning and end of each inner cycle 410, where each inner cycle 410 may include an active time 415 at the beginning, where the periodic signal 420 may fall within the active time 415. In some cases, if the UE 115 enters a sleep state after an active time 415 in each inner cycle 410, the UE 115 may refrain from receiving or transmitting reports based on periodic signals 420 transmitted by the network entity 105 during the sleep state. In some cases, the network entity 105 may refrain from transmitting the periodic signals 420 at the end of each inner cycle 410 based on a determination or an indication (e.g., from the UE 115) that the UE 115 will be in a sleep state during a period of time at the end of each inner cycle 410. In some examples, the two-step C-DRX configuration may similarly be used to align transmission of the periodic signals 420 with a non-integer periodic C-DRX configuration. For example, the UE 115 may use the two-stage C-DRX configuration to align with a rational or non-integer period of XR communications being 60 fps, or 16.666 ms with a subspace carrier spacing (SCS) of 30 kilohertz (kHz), or 2.5 ms.

Figure 5:
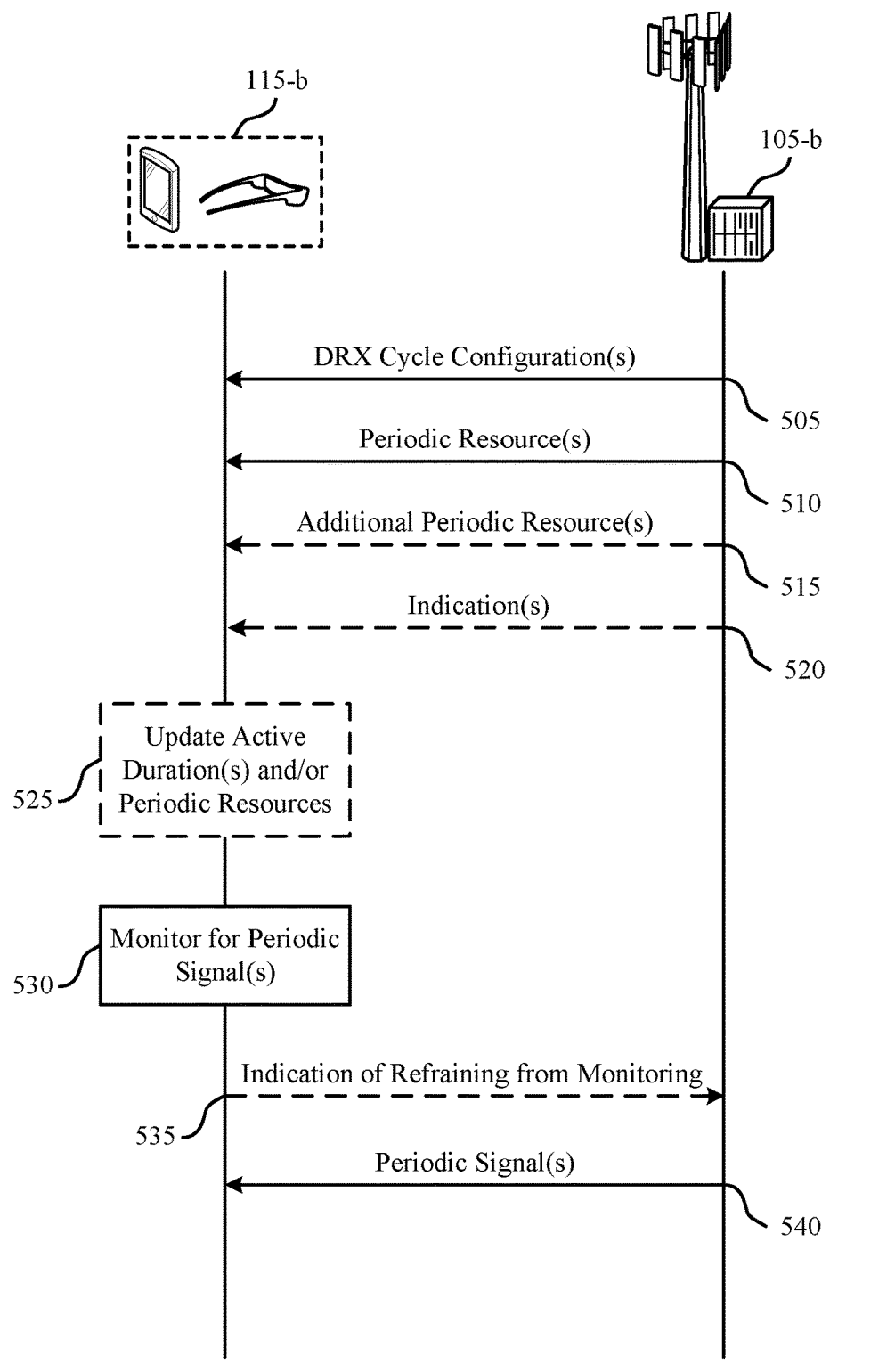
FIG. 5 illustrates an example of a process flow that supports monitoring for periodic signals during non-uniform DRX cycles in accordance with one or more aspects of the present disclosure.

FIG. 5 illustrates an example of a process flow 500 that supports monitoring for periodic signals during non-uniform DRX cycles in accordance with one or more aspects of the present disclosure. The process flow 500 may be implemented by aspects of the wireless communications systems 100 or 200, or the signaling diagrams 301, 301, 301, and 400. For example, the process flow 500 may illustrate communication between a UE 115-b and a network entity 105-b, which may be examples of corresponding devices described herein, including with reference to FIGS. 1 through 4.

In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

In some examples, the UE 115-b may be an example of an XR UE, such as VR goggles, or glasses. Additionally, or alternatively, the UE 115-b may be a mobile device.

At 505, the network entity 105-b may output (e.g., transmit), and the UE 115-b may receive (e.g., obtain), a first control message identifying a first DRX cycle for the UE 115-b to use and a second DRX cycle for the UE 115-b to use different from the first DRX cycle. In some cases, the first DRX cycle may have a first active duration and the second DRX cycle having a second active duration. In some cases, the network entity 105-b may output the first control message to one or more UEs including the UE 115-b, where the first DRX cycle and the second DRX cycle may be for the one or more UEs to use. In some cases, the first control message may include a WUS, a DCI message, a MAC-CE, or any combination thereof.

At 510, the network entity 105-b may output (e.g., transmit), and the UE 115-b may receive (e.g., obtain), a second control message scheduling periodic resources for the UE 115-b to use to monitor for a periodic signal, the periodic resources being outside of at least the first active duration. In some cases, the network entity 105-b may output the second control message to the one or more UEs, where the periodic resources may be for the one or more UEs to use to monitor for the periodic signal. In some cases, the periodic resources may include one or more of a CSI-RS resource, a search space set (e.g., a CSS set), a SPS resource, a CG resource, or an SRS resource. In some examples, the periodic resources may correspond to a period associated with an integer value, one or more rational numbers (e.g., fractions), a timing reference value corresponding to an SFN, or any combination thereof.

At 515, the network entity 105-b may optionally output (e.g., transmit) a third control message scheduling additional periodic resources for at least one UE of the one or more UEs, wherein the additional periodic resources are different than the periodic resources. For example, the network entity 105-b may transmit a third control message to the UE 115-b including the additional periodic resources, where the additional periodic resources may be for one or more copies of periodic messages as described with reference to FIG. 3C. In some cases, the network entity 105-b may transmit the third control message to one or more XR UEs including the UE 115-b, where the UE 115-b may be an XR UE.

At 520, the network entity 105-b may output (e.g., transmit), and the UE 115-b may receive (e.g., obtain), one or more indications. For example, the network entity 105-b may output an indication for at least one UE of the one or more UEs to update the periodic resources for the periodic signal to overlap the first active duration. In some cases, the at least one UE may be the UE 115-b, where the UE 115-b may receive (e.g., obtain) the indication. Additionally, or alternatively, the network entity 105-b may output, and the UE 115-b may receive, according to a period derived from a fraction of two integers, one or more indications for updating the periodic resources, wherein the first control message is received according to the period.

In some examples, the network entity 105-b may output (e.g., transmit) the one or more additional indications for updating the periodic resources according to the period derived from the fraction of two integers to the one or more UEs. In some examples, the network entity 105-b may output, and the UE 115-b or one or more UEs 115 may receive, an indication for updating the periodic resources, where the indication is received via the first control message. In some cases, any of the indications described herein may be included in the first control message, the second control message, or both. Additionally, or alternatively, any of the indications described herein may be transmitted separately from the first control message and the second control message (e.g., in another DCI, RRC, or other message).

In some examples, the network entity 105-b may output (e.g., transmit), and the UE 115-b may receive (e.g., obtain), an indication of a relationship between the first DRX cycle and the periodic resources, where the relationship corresponds to a period of the periodic resources, a start time of the first DRX cycle, the first active duration, a time difference between the periodic resources and the first active duration, or any combination thereof. Additionally, or alternatively, the network entity 105-b may output, and the UE 115-b may receive, an indication of an update to the first active duration, where the update to the first active duration includes starting a third active duration for the periodic resources in accordance with the indication or extending the first active duration for the periodic resources in accordance with the indication. In some cases, the network entity 105-b may output, and the UE 115-b may receive, an indication to monitor during the first active duration and a third active duration, wherein the first DRX cycle is a two-stage DRX cycle with the first active duration and the third active duration.

At 525, the UE 115-b may optionally update one or more active durations, the periodic resources, or both. For example, the UE 115-b (or one or more XR UEs) may update the first active duration, the periodic resources, or both in accordance with the relationship between the first DRX cycle and the periodic resources. In some examples, updating the first active duration includes starting a third active duration for the periodic resources in accordance with the indication or extending the first active duration for the periodic resources in accordance with the indication as described herein. Additionally, or alternatively, the UE 115-b may update the first active duration to include the first active duration and the third active duration.

At 530, the UE 115-b (or the one or more UEs) may monitor, based on the periodic resources being outside the first active duration, for one or more periodic signals, including the periodic signal, during the first active duration based on updating the first active duration, updating the periodic resources, or both. In some examples, the UE 115-*b* may optionally refrain from monitoring for the periodic signal during the second active duration based on the periodic resources being outside of the second active duration.

At 535, the UE 115-*b* may optionally transmit (e.g., output) an indication that the UE 115-*b* is refraining from monitoring for the periodic signal to a network entity. In some cases, the network entity 105-*b* may obtain (e.g., receive) an indication that at least one UE of the one or more UEs is refraining from monitoring for the periodic signal, where the indication may include the indication transmitted by the UE 115-*b*.

At 540, the network entity 105-*b* may output, and the UE 115-*b* (or the one or more UEs 115) may receive (e.g., obtain), based on the periodic resources being outside the first active duration, the periodic signal during the first active duration based on updating the first active duration, updating the periodic resources, or both.

Figure 6:
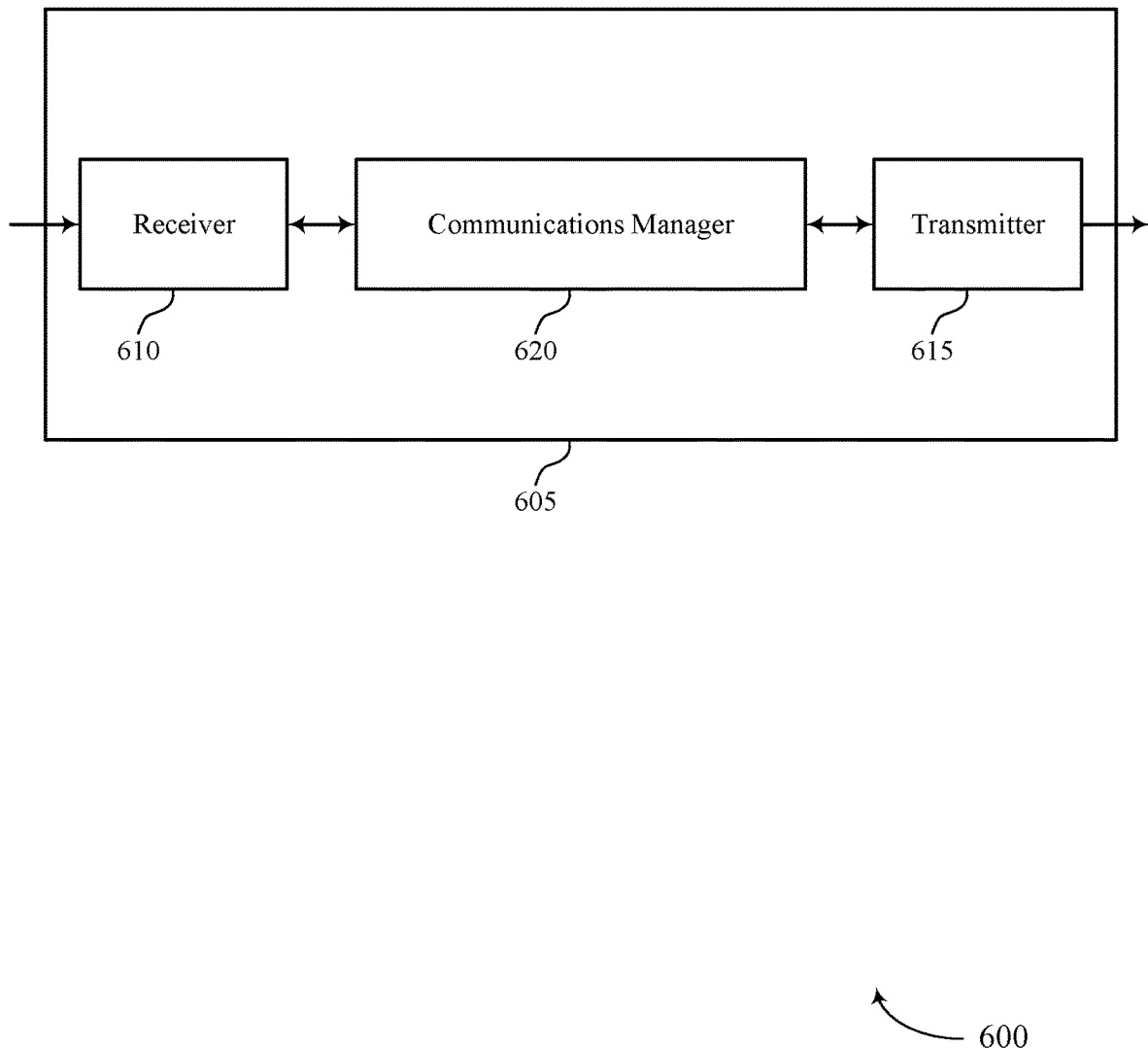
FIGS. 6 and 7 show block diagrams of devices that support monitoring for periodic signals during non-uniform DRX cycles in accordance with one or more aspects of the present disclosure.

FIG. 6 shows a block diagram 600 of a device 605 that supports monitoring for periodic signals during non-uniform DRX cycles in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to monitoring for periodic signals during non-uniform DRX cycles). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to monitoring for periodic signals during non-uniform DRX cycles). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of monitoring for periodic signals during non-uniform DRX cycles as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first control message identifying a first DRX cycle for the UE to use and a second DRX cycle for the UE to use different than the first DRX cycle, the first DRX cycle having a first active duration and the second DRX cycle having a second active duration. The communications manager 620 may be configured as or otherwise support a means for receiving a second control message identifying periodic resources for the UE to use to monitor for a periodic signal, the periodic resources being outside at least the first active duration. The communications manager 620 may be configured as or otherwise support a means for monitoring, based on the periodic resources being outside the first active duration, for the periodic signal during the first active duration based on updating the first active duration, updating the periodic resources, or both.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
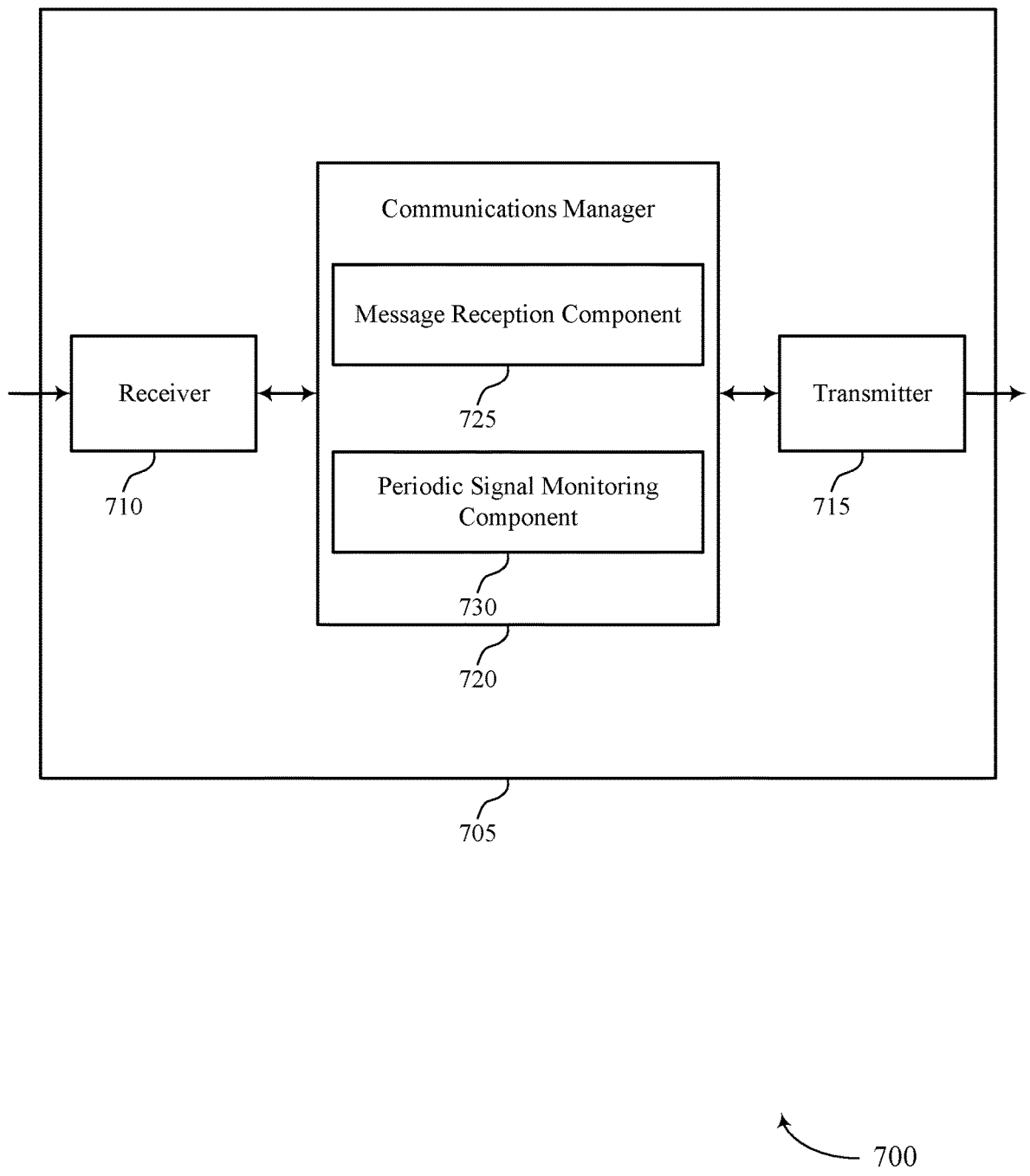

FIG. 7 shows a block diagram 700 of a device 705 that supports monitoring for periodic signals during non-uniform DRX cycles in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to monitoring for periodic signals during non-uniform DRX cycles). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to monitoring for periodic signals during non-uniform DRX cycles). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of monitoring for periodic signals during non-uniform DRX cycles as described herein. For example, the communications manager 720 may include a message reception component 725 a periodic signal monitoring component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The message reception component 725 may be configured as or otherwise support a means for receiving a first control message identifying a first DRX cycle for the UE to use and a second DRX cycle for the UE to use different than the first DRX cycle, the first DRX cycle having a first active duration and the second DRX cycle having a second active duration. The message reception component 725 may be configured as or otherwise support a means for receiving a second control message identifying periodic resources for the UE to use to monitor for a periodic signal, the periodic resources being outside at least the first active duration. The periodic signal monitoring component 730 may be configured as or otherwise support a means for monitoring, based on the periodic resources being outside the first active duration, for the periodic signal during the first active duration based on updating the first active duration, updating the periodic resources, or both.

Figure 8:
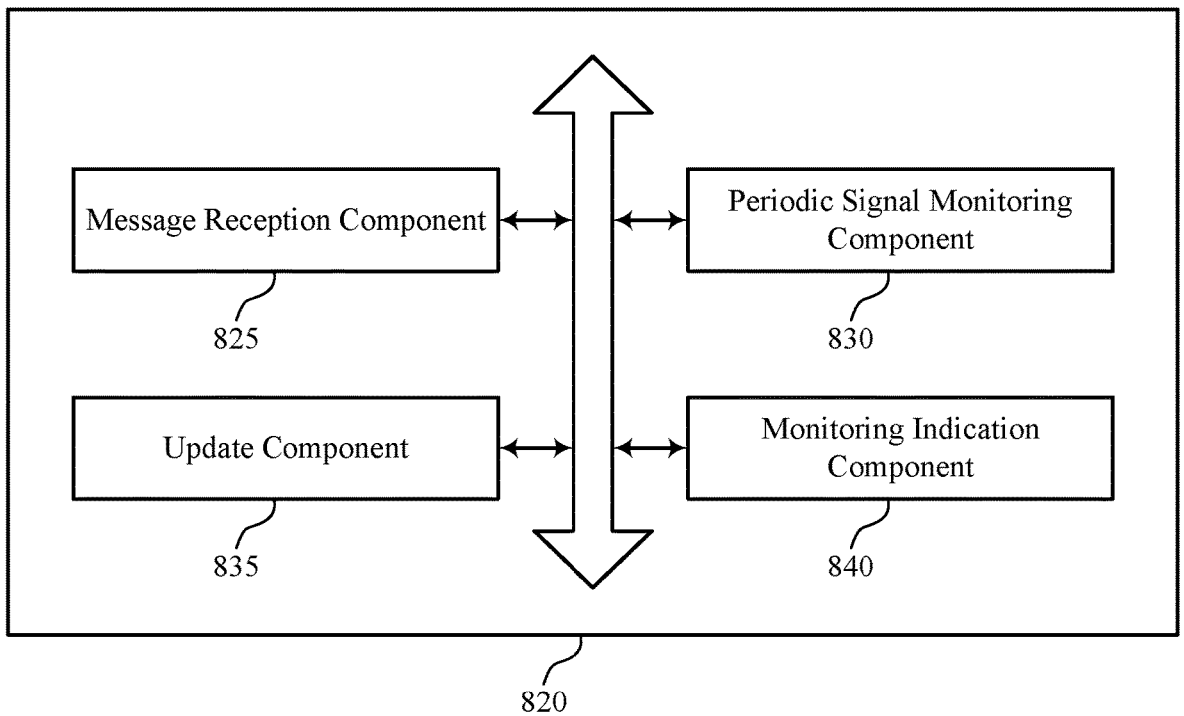
FIG. 8 shows a block diagram of a communications manager that supports monitoring for periodic signals during non-uniform DRX cycles in accordance with one or more aspects of the present disclosure.

FIG. 8 shows a block diagram 800 of a communications manager 820 that supports monitoring for periodic signals during non-uniform DRX cycles in accordance with one or more aspects of the present disclosure. The communications manager 820 may be an example of aspects of a communications manager 620, a communications manager 720, or both, as described herein. The communications manager 820, or various components thereof, may be an example of means for performing various aspects of monitoring for periodic signals during non-uniform DRX cycles as described herein. For example, the communications manager 820 may include a message reception component 825, a periodic signal monitoring component 830, an update component 835, a monitoring indication component 840, or any combination thereof. Each of these components may communicate, directly or indirectly, with one another (e.g., via one or more buses).

The communications manager 820 may support wireless communication at a UE in accordance with examples as disclosed herein. The message reception component 825 may be configured as or otherwise support a means for receiving a first control message identifying a first DRX cycle for the UE to use and a second DRX cycle for the UE to use different than the first DRX cycle, the first DRX cycle having a first active duration and the second DRX cycle having a second active duration. In some examples, the message reception component 825 may be configured as or otherwise support a means for receiving a second control message identifying periodic resources for the UE to use to monitor for a periodic signal, the periodic resources being outside at least the first active duration. The periodic signal monitoring component 830 may be configured as or otherwise support a means for monitoring, based on the periodic resources being outside the first active duration, for the periodic signal during the first active duration based on updating the first active duration, updating the periodic resources, or both.

In some examples, the message reception component 825 may be configured as or otherwise support a means for receiving an indication for the UE to update the periodic resources for the periodic signal to overlap the first active duration.

In some examples, the message reception component 825 may be configured as or otherwise support a means for receiving, according to a period derived from a fraction of two integers, one or more indications for updating the periodic resources, where the first control message is received according to the period.

In some examples, the message reception component 825 may be configured as or otherwise support a means for receiving an indication for updating the periodic resources, where the indication is received via the first control message and the first control message includes a WUS, a DCI message, a MAC-CE, or any combination thereof.

In some examples, the message reception component 825 may be configured as or otherwise support a means for receiving an indication of a relationship between the first DRX cycle and the periodic resources, where the relationship corresponds to a period of the periodic resources, a start time of the first DRX cycle, the first active duration, a time difference between the periodic resources and the first active duration, or any combination thereof. In some examples, the update component 835 may be configured as or otherwise support a means for updating the first active duration, updating the periodic resources, or both in accordance with the relationship between the first DRX cycle and the periodic resources.

In some examples, the message reception component 825 may be configured as or otherwise support a means for receiving an indication of an update to the first active duration, where updating the first active duration includes starting a third active duration for the periodic resources in accordance with the indication or extending the first active duration for the periodic resources in accordance with the indication.

In some examples, the message reception component 825 may be configured as or otherwise support a means for receiving an indication to monitor during the first active duration and a third active duration, where the first DRX cycle is a two-stage DRX cycle with the first active duration and the third active duration. In some examples, the update component 835 may be configured as or otherwise support a means for updating the first active duration to include the first active duration and the third active duration.

In some examples, the periodic signal monitoring component 830 may be configured as or otherwise support a means for refraining from monitoring for the periodic signal during the second active duration based on the periodic resources being outside of the second active duration. In some examples, the monitoring indication component 840 may be configured as or otherwise support a means for transmitting an indication that the UE is refraining from monitoring for the periodic signal to a network entity.

In some examples, the periodic resources for the UE to use to monitor for the periodic signal include one or more of a CSI-RS resource, a search space set, a SPS resource, a CG resource, or an SRS resource.

In some examples, the periodic resources correspond to a period associated with an integer value, one or more rational numbers, a timing reference value corresponding to an SFN, or any combination thereof.

Figure 9:
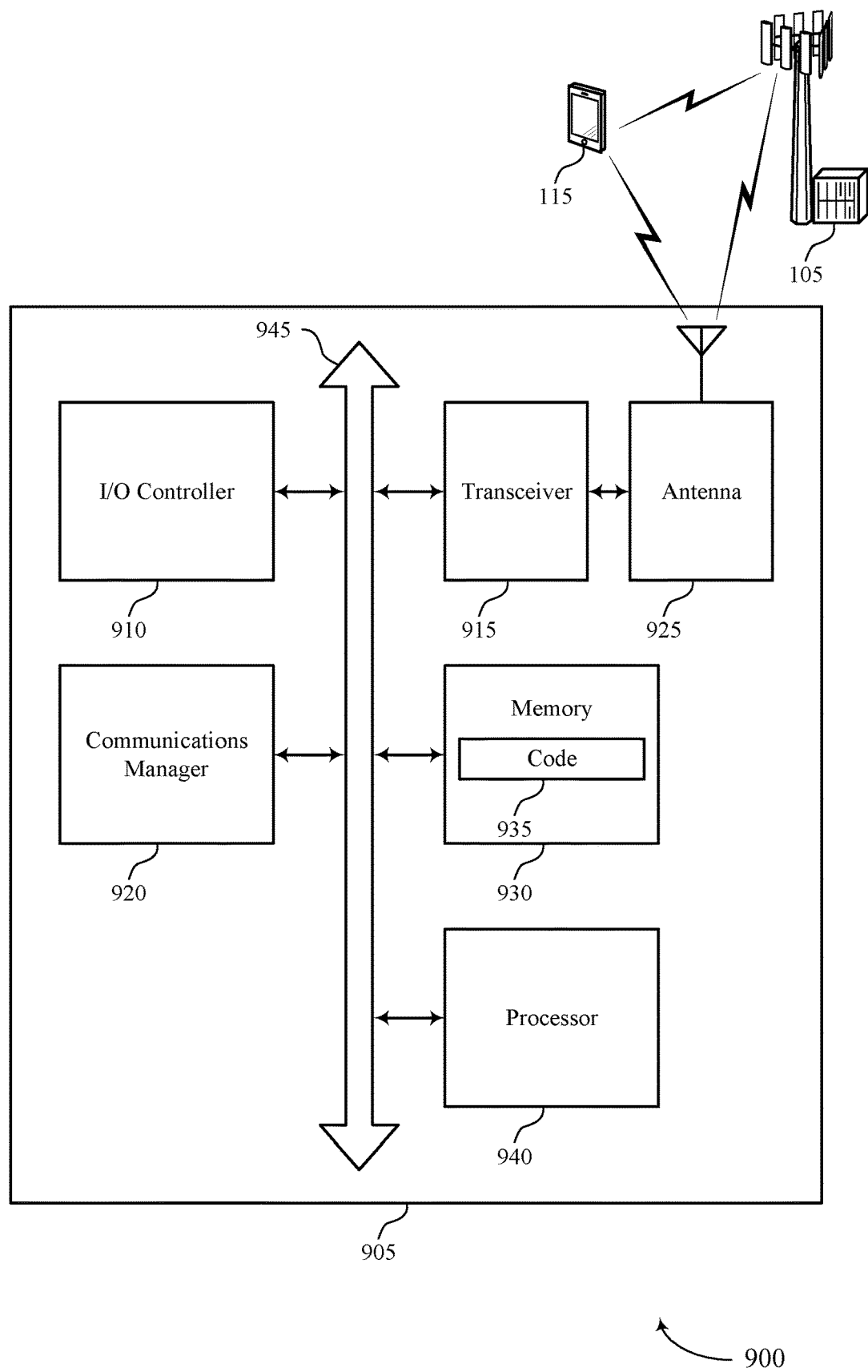
FIG. 9 shows a diagram of a system including a device that supports monitoring for periodic signals during non-uniform DRX cycles in accordance with one or more aspects of the present disclosure.

FIG. 9 shows a diagram of a system 900 including a device 905 that supports monitoring for periodic signals during non-uniform DRX cycles in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting monitoring for periodic signals during non-uniform DRX cycles). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first control message identifying a first DRX cycle for the UE to use and a second DRX cycle for the UE to use different than the first DRX cycle, the first DRX cycle having a first active duration and the second DRX cycle having a second active duration. The communications manager 920 may be configured as or otherwise support a means for receiving a second control message identifying periodic resources for the UE to use to monitor for a periodic signal, the periodic resources being outside at least the first active duration. The communications manager 920 may be configured as or otherwise support a means for monitoring, based on the periodic resources being outside the first active duration, for the periodic signal during the first active duration based on updating the first active duration, updating the periodic resources, or both.

By including or configuring the communications manager 920 in accordance with examples as described herein, the device 905 may support techniques for reduced power consumption, more efficient utilization of communication resources, reduced latency, reduced jitter, and improved communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of monitoring for periodic signals during non-uniform DRX cycles as described herein, or the processor 940 and the memory 930 may be otherwise configured to perform or support such operations.

Figure 10:
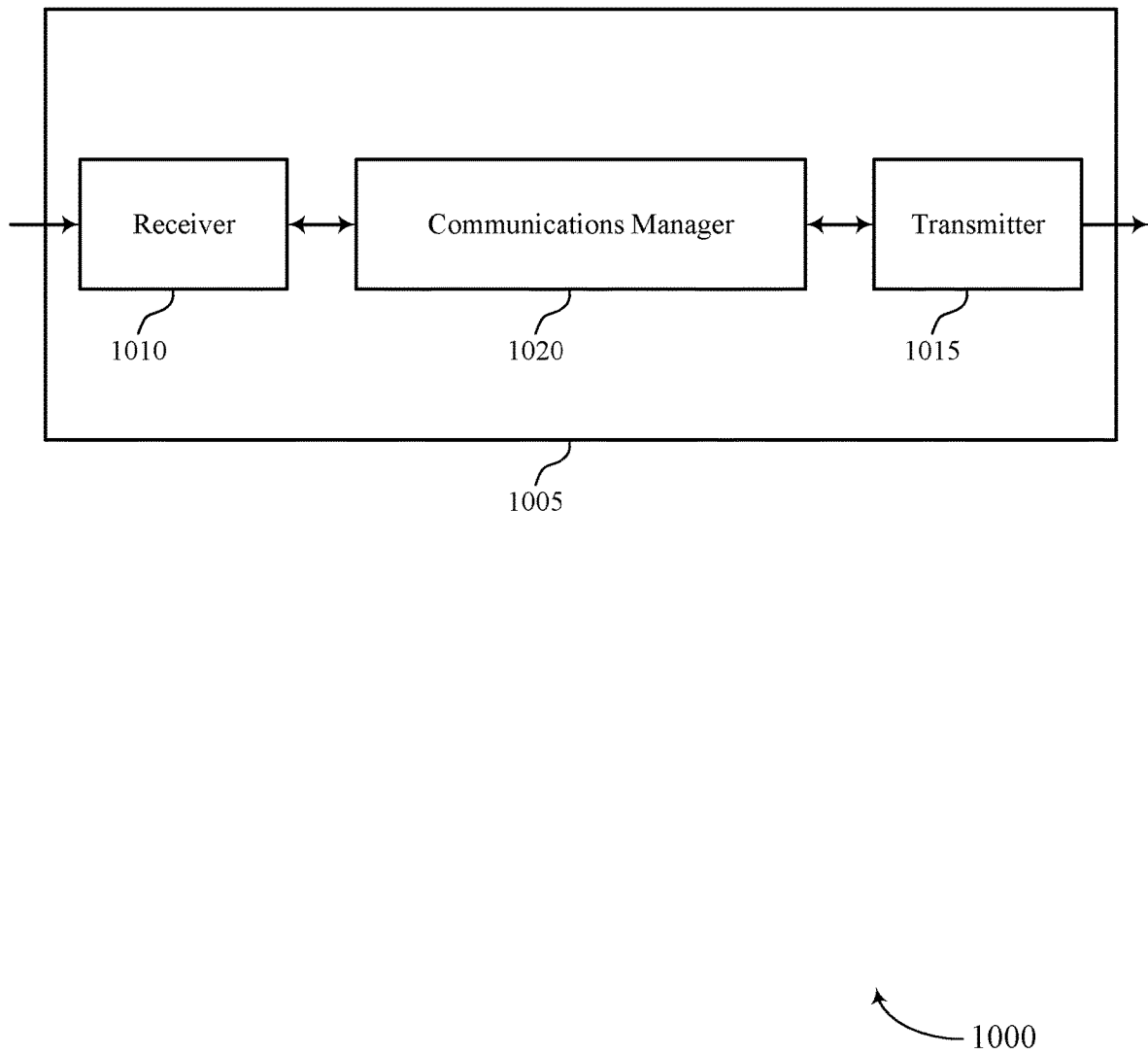
FIGS. 10 and 11 show block diagrams of devices that support monitoring for periodic signals during non-uniform DRX cycles in accordance with one or more aspects of the present disclosure.

FIG. 10 shows a block diagram 1000 of a device 1005 that supports monitoring for periodic signals during non-uniform DRX cycles in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of monitoring for periodic signals during non-uniform DRX cycles as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for outputting a first control message identifying a first DRX cycle for one or more UEs to use and a second DRX cycle for the one or more UEs to use different than the first DRX cycle, the first DRX cycle having a first active duration and the second DRX cycle having a second active duration. The communications manager 1020 may be configured as or otherwise support a means for outputting a second control message scheduling periodic resources for the one or more UEs to use to monitor for a periodic signal, the periodic resources being outside of at least the first active duration. The communications manager 1020 may be configured as or otherwise support a means for outputting, based on the periodic resources being outside the first active duration, the periodic signal during the first active duration based on updating the first active duration, updating the periodic resources, or both.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources.

Figure 11:
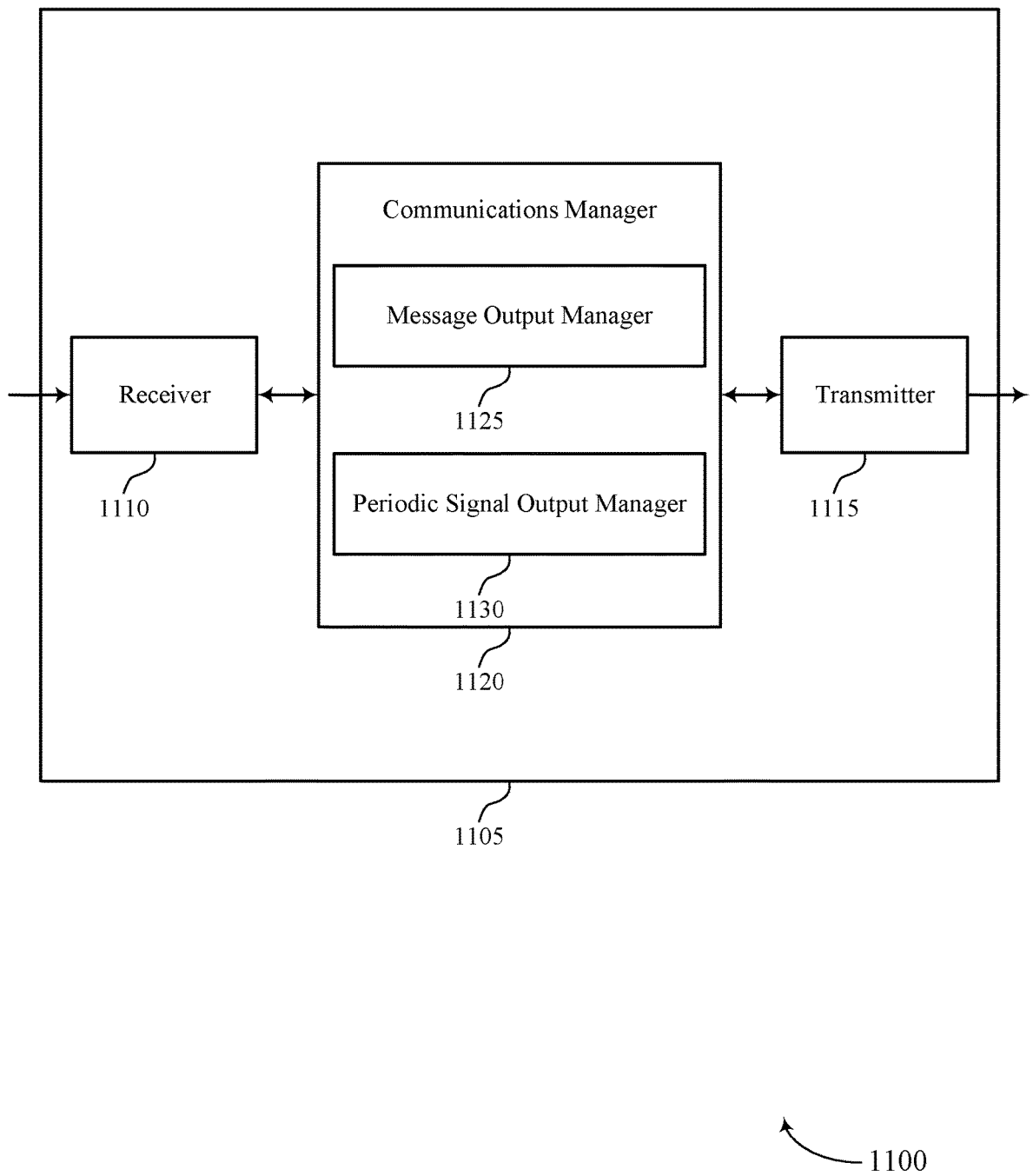

FIG. 11 shows a block diagram 1100 of a device 1105 that supports monitoring for periodic signals during non-uniform DRX cycles in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of monitoring for periodic signals during non-uniform DRX cycles as described herein. For example, the communications manager 1120 may include a message output manager 1125 a periodic signal output manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The message output manager 1125 may be configured as or otherwise support a means for outputting a first control message identifying a first DRX cycle for one or more UEs to use and a second DRX cycle for the one or more UEs to use different than the first DRX cycle, the first DRX cycle having a first active duration and the second DRX cycle having a second active duration. The message output manager 1125 may be configured as or otherwise support a means for outputting a second control message scheduling periodic resources for the one or more UEs to use to monitor for a periodic signal, the periodic resources being outside of at least the first active duration. The periodic signal output manager 1130 may be configured as or otherwise support a means for outputting, based on the periodic resources being outside the first active duration, the periodic signal during the first active duration based on updating the first active duration, updating the periodic resources, or both.

Figure 12:
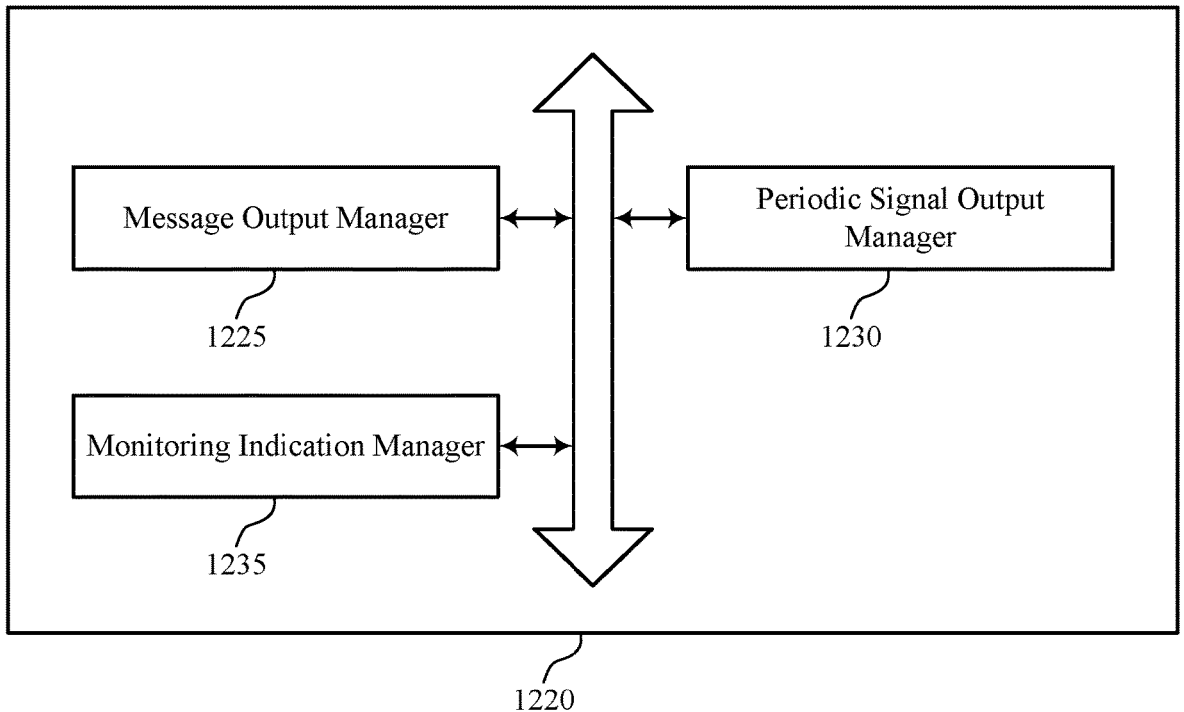
FIG. 12 shows a block diagram of a communications manager that supports monitoring for periodic signals during non-uniform DRX cycles in accordance with one or more aspects of the present disclosure.

FIG. 12 shows a block diagram 1200 of a communications manager 1220 that supports monitoring for periodic signals during non-uniform DRX cycles in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of monitoring for periodic signals during non-uniform DRX cycles as described herein. For example, the communications manager 1220 may include a message output manager 1225, a periodic signal output manager 1230, a monitoring indication manager 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The message output manager 1225 may be configured as or otherwise support a means for outputting a first control message identifying a first DRX cycle for one or more UEs to use and a second DRX cycle for the one or more UEs to use different than the first DRX cycle, the first DRX cycle having a first active duration and the second DRX cycle having a second active duration. In some examples, the message output manager 1225 may be configured as or otherwise support a means for outputting a second control message scheduling periodic resources for the one or more UEs to use to monitor for a periodic signal, the periodic resources being outside of at least the first active duration. The periodic signal output manager 1230 may be configured as or otherwise support a means for outputting, based on the periodic resources being outside the first active duration, the periodic signal during the first active duration based on updating the first active duration, updating the periodic resources, or both.

In some examples, to support updating the periodic resources, the message output manager 1225 may be configured as or otherwise support a means for outputting a third control message scheduling additional periodic resources for at least one UE of the one or more UEs, where the additional periodic resources are different than the periodic resources.

In some examples, the message output manager 1225 may be configured as or otherwise support a means for outputting an indication for at least one UE of the one or more UEs to update the periodic resources for the periodic signal to overlap the first active duration.

In some examples, the message output manager 1225 may be configured as or otherwise support a means for outputting, according to a period derived from a fraction of two integers, one or more indications for updating the periodic resources, where the first control message is output according to the period.

In some examples, the message output manager 1225 may be configured as or otherwise support a means for outputting an indication for updating the periodic resources, where the indication is output via the first control message and the first control message includes a WUS, a DCI message, a MAC-CE, or any combination thereof.

In some examples, the message output manager 1225 may be configured as or otherwise support a means for outputting an indication of a relationship between the first DRX cycle and the periodic resources, where the relationship corresponds to a period of the periodic resources, a start time of the first DRX cycle, the first active duration, a time difference between the periodic resources and the first active duration, or any combination thereof.

In some examples, the message output manager 1225 may be configured as or otherwise support a means for outputting an indication of an update to the first active duration, where the update to the first active duration includes starting a third active duration for the periodic resources in accordance with the indication or extending the first active duration for the periodic resources in accordance with the indication.

In some examples, the message output manager 1225 may be configured as or otherwise support a means for outputting an indication to monitor during the first active duration and a third active duration, where the first DRX cycle is a two-stage DRX cycle with the first active duration and the third active duration.

In some examples, the monitoring indication manager 1235 may be configured as or otherwise support a means for obtaining an indication that at least one UE of the one or more UEs is refraining from monitoring for the periodic signal.

In some examples, the periodic resources for the one or more UEs to use to monitor for the periodic signal include one or more of a CSI-RS resource, a search space set, a SPS resource, a CG resource, or an SRS resource.

In some examples, the periodic resources correspond to a period associated with an integer value, one or more rational numbers, a timing reference value corresponding to an SFN, or any combination thereof.

Figure 13:
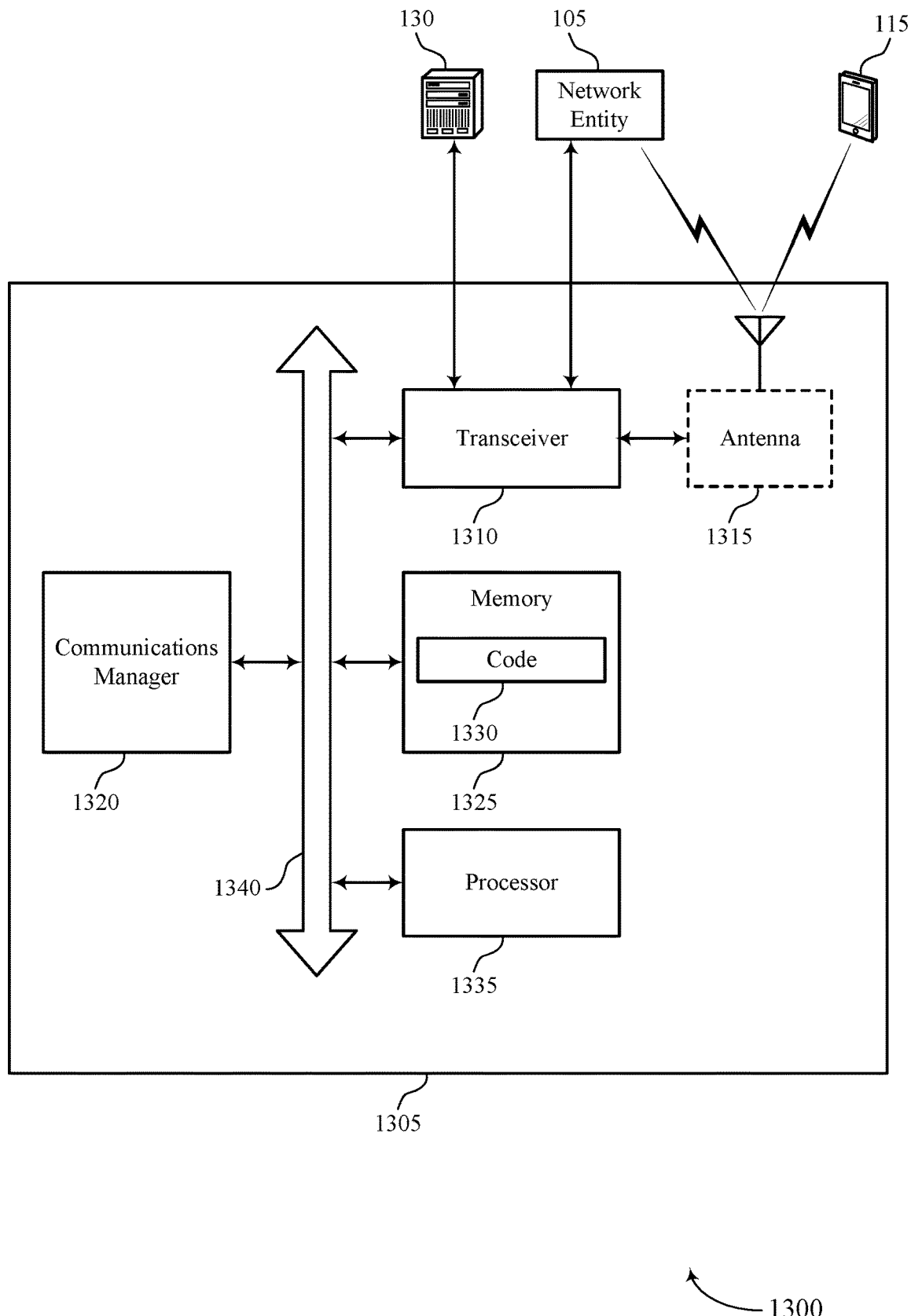
FIG. 13 shows a diagram of a system including a device that supports monitoring for periodic signals during non-uniform DRX cycles in accordance with one or more aspects of the present disclosure.

FIG. 13 shows a diagram of a system 1300 including a device 1305 that supports monitoring for periodic signals during non-uniform DRX cycles in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting monitoring for periodic signals during non-uniform DRX cycles). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for outputting a first control message identifying a first DRX cycle for one or more UEs to use and a second DRX cycle for the one or more UEs to use different than the first DRX cycle, the first DRX cycle having a first active duration and the second DRX cycle having a second active duration. The communications manager 1320 may be configured as or otherwise support a means for outputting a second control message scheduling periodic resources for the one or more UEs to use to monitor for a periodic signal, the periodic resources being outside of at least the first active duration. The communications manager 1320 may be configured as or otherwise support a means for outputting, based on the periodic resources being outside the first active duration, the periodic signal during the first active duration based on updating the first active duration, updating the periodic resources, or both.

By including or configuring the communications manager 1320 in accordance with examples as described herein, the device 1305 may support techniques for reduced power consumption, more efficient utilization of communication resources, reduced latency, reduced jitter, and improved communication reliability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of monitoring for periodic signals during non-uniform DRX cycles as described herein, or the processor 1335 and the memory 1325 may be otherwise configured to perform or support such operations.

Figure 14:
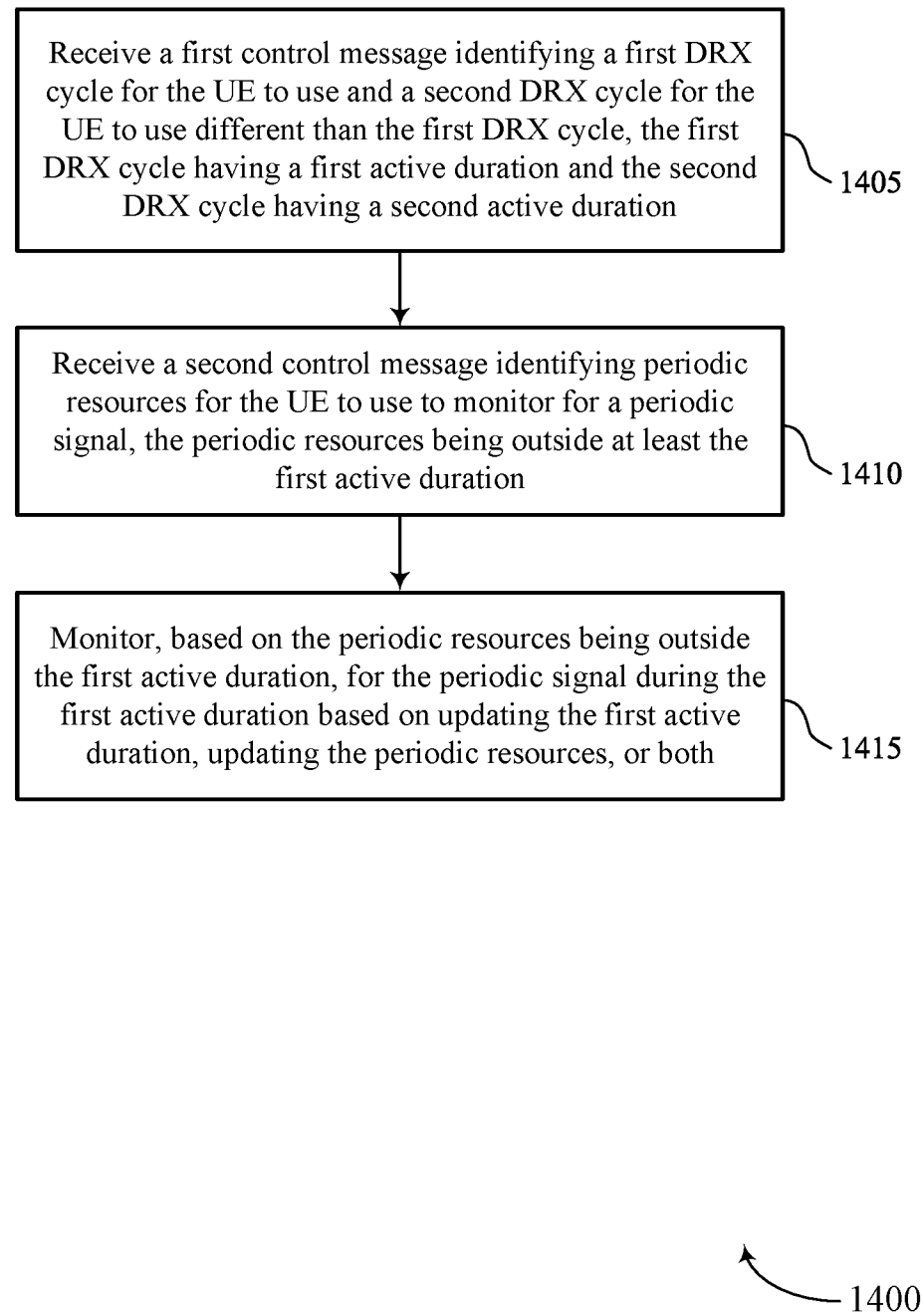
FIGS. 14 through 17 show flowcharts illustrating methods that support monitoring for periodic signals during non-uniform DRX cycles in accordance with one or more aspects of the present disclosure.

FIG. 14 shows a flowchart illustrating a method 1400 that supports monitoring for periodic signals during non-uniform DRX cycles in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first control message identifying a first DRX cycle for the UE to use and a second DRX cycle for the UE to use different than the first DRX cycle, the first DRX cycle having a first active duration and the second DRX cycle having a second active duration. The operations of 1405 may be performed in accordance with examples as disclosed herein. In some examples, aspects of the operations of 1405 may be performed by a message reception component 825 as described with reference to FIG. 8.

At 1410, the method may include receiving a second control message identifying periodic resources for the UE to use to monitor for a periodic signal, the periodic resources being outside at least the first active duration. The operations of 1410 may be performed in accordance with examples as disclosed herein. In some examples, aspects of the operations of 1410 may be performed by a message reception component 825 as described with reference to FIG. 8.

At 1415, the method may include monitoring, based on the periodic resources being outside the first active duration, for the periodic signal during the first active duration based on updating the first active duration, updating the periodic resources, or both. The operations of 1415 may be performed in accordance with examples as disclosed herein. In some examples, aspects of the operations of 1415 may be performed by a periodic signal monitoring component 830 as described with reference to FIG. 8.

Figure 15:
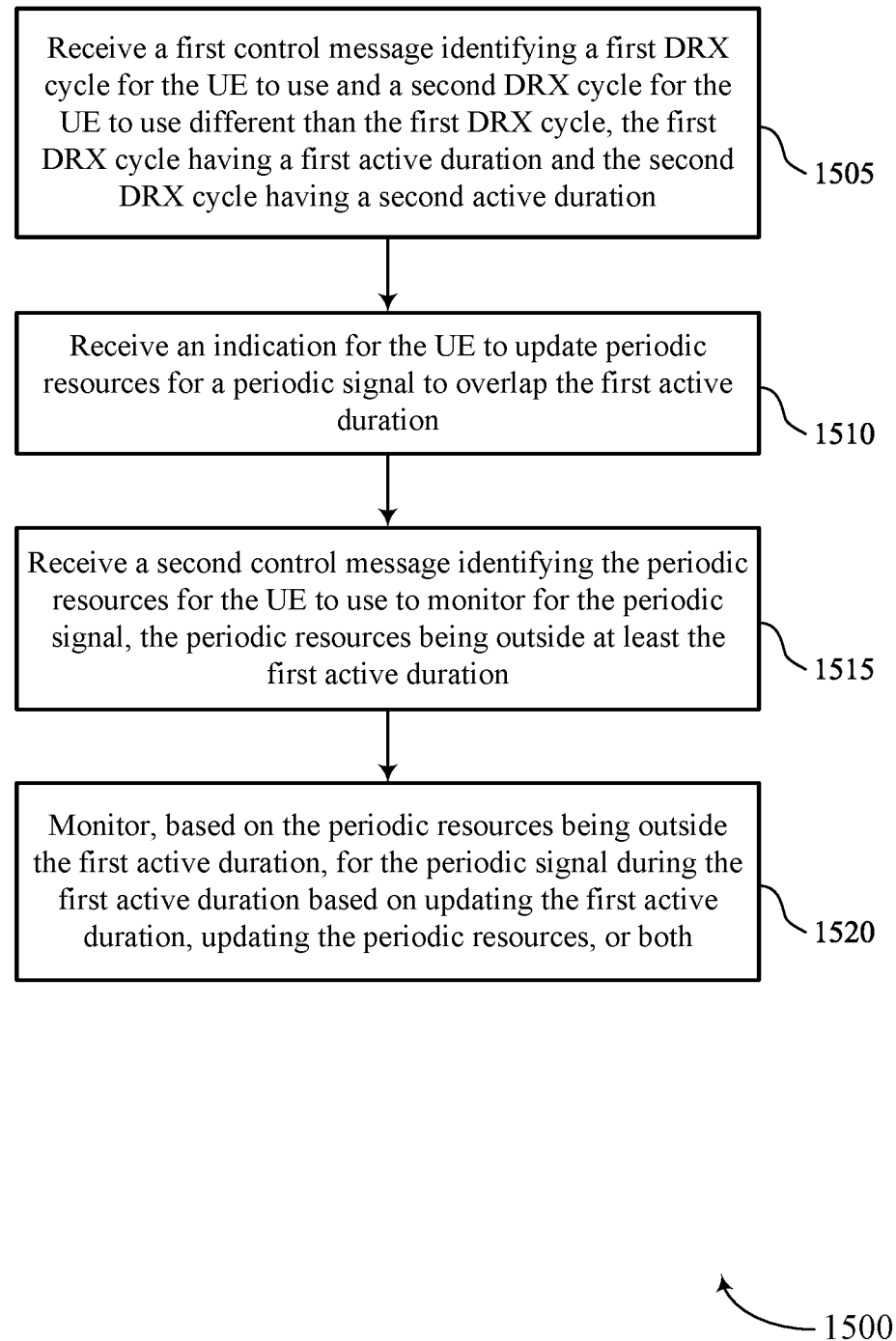

FIG. 15 shows a flowchart illustrating a method 1500 that supports monitoring for periodic signals during non-uniform DRX cycles in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first control message identifying a first DRX cycle for the UE to use and a second DRX cycle for the UE to use different than the first DRX cycle, the first DRX cycle having a first active duration and the second DRX cycle having a second active duration. The operations of 1505 may be performed in accordance with examples as disclosed herein. In some examples, aspects of the operations of 1505 may be performed by a message reception component 825 as described with reference to FIG. 8.

At 1510, the method may include receiving an indication for the UE to update periodic resources for a periodic signal to overlap the first active duration. The operations of 1510 may be performed in accordance with examples as disclosed herein. In some examples, aspects of the operations of 1510 may be performed by a message reception component 825 as described with reference to FIG. 8.

At 1515, the method may include receiving a second control message identifying the periodic resources for the UE to use to monitor for the periodic signal, the periodic resources being outside at least the first active duration. The operations of 1515 may be performed in accordance with examples as disclosed herein. In some examples, aspects of the operations of 1515 may be performed by a message reception component 825 as described with reference to FIG. 8.

At 1520, the method may include monitoring, based on the periodic resources being outside the first active duration, for the periodic signal during the first active duration based on updating the first active duration, updating the periodic resources, or both. The operations of 1520 may be performed in accordance with examples as disclosed herein. In some examples, aspects of the operations of 1520 may be performed by a periodic signal monitoring component 830 as described with reference to FIG. 8.

Figure 16:
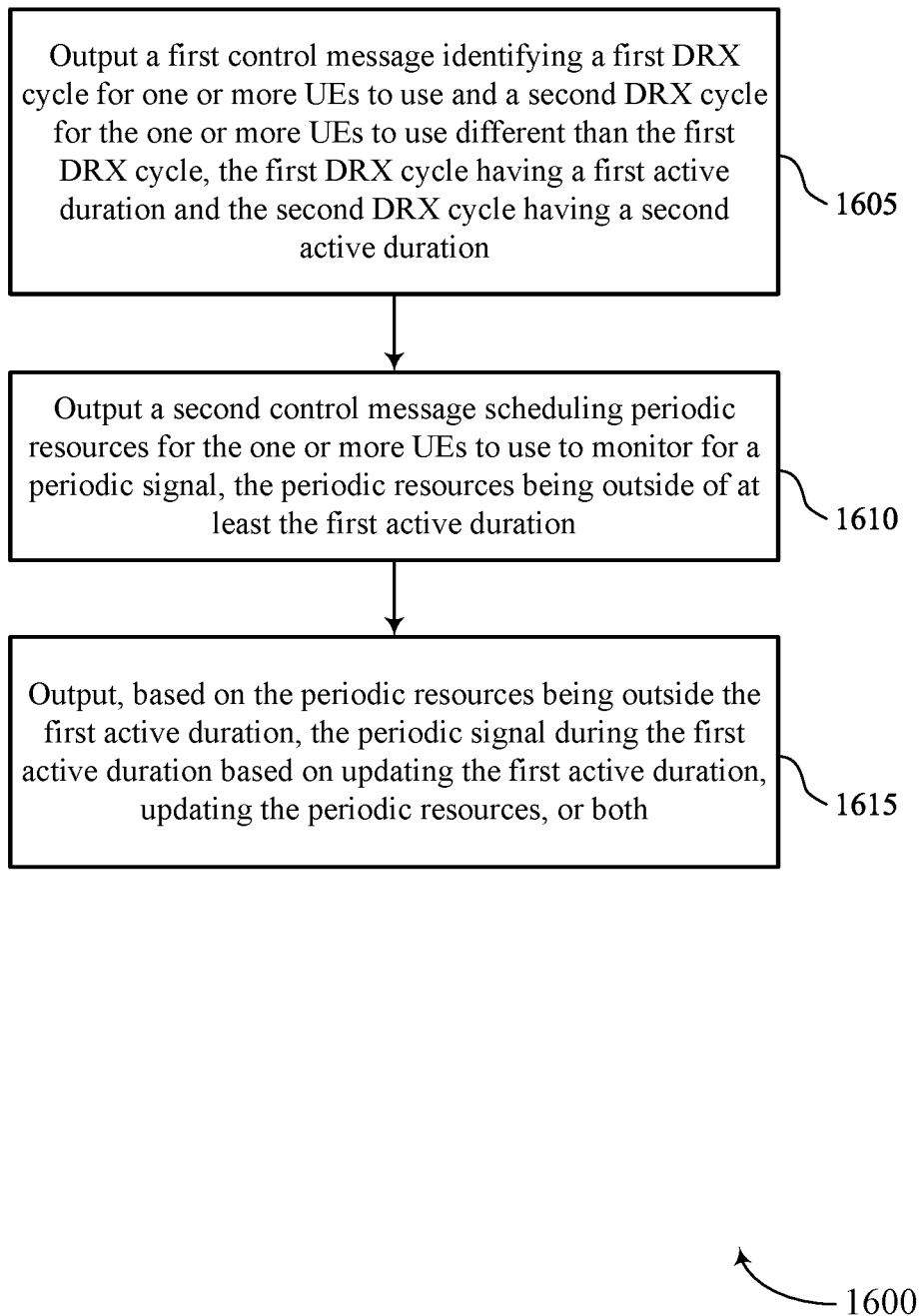

FIG. 16 shows a flowchart illustrating a method 1600 that supports monitoring for periodic signals during non-uniform DRX cycles in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting a first control message identifying a first DRX cycle for one or more UEs to use and a second DRX cycle for the one or more UEs to use different than the first DRX cycle, the first DRX cycle having a first active duration and the second DRX cycle having a second active duration. The operations of 1605 may be performed in accordance with examples as disclosed herein. In some examples, aspects of the operations of 1605 may be performed by a message output manager 1225 as described with reference to FIG. 12.

At 1610, the method may include outputting a second control message scheduling periodic resources for the one or more UEs to use to monitor for a periodic signal, the periodic resources being outside of at least the first active duration. The operations of 1610 may be performed in accordance with examples as disclosed herein. In some examples, aspects of the operations of 1610 may be performed by a message output manager 1225 as described with reference to FIG. 12.

At 1615, the method may include outputting, based on the periodic resources being outside the first active duration, the periodic signal during the first active duration based on updating the first active duration, updating the periodic resources, or both. The operations of 1615 may be performed in accordance with examples as disclosed herein. In some examples, aspects of the operations of 1615 may be performed by a periodic signal output manager 1230 as described with reference to FIG. 12.

Figure 17:
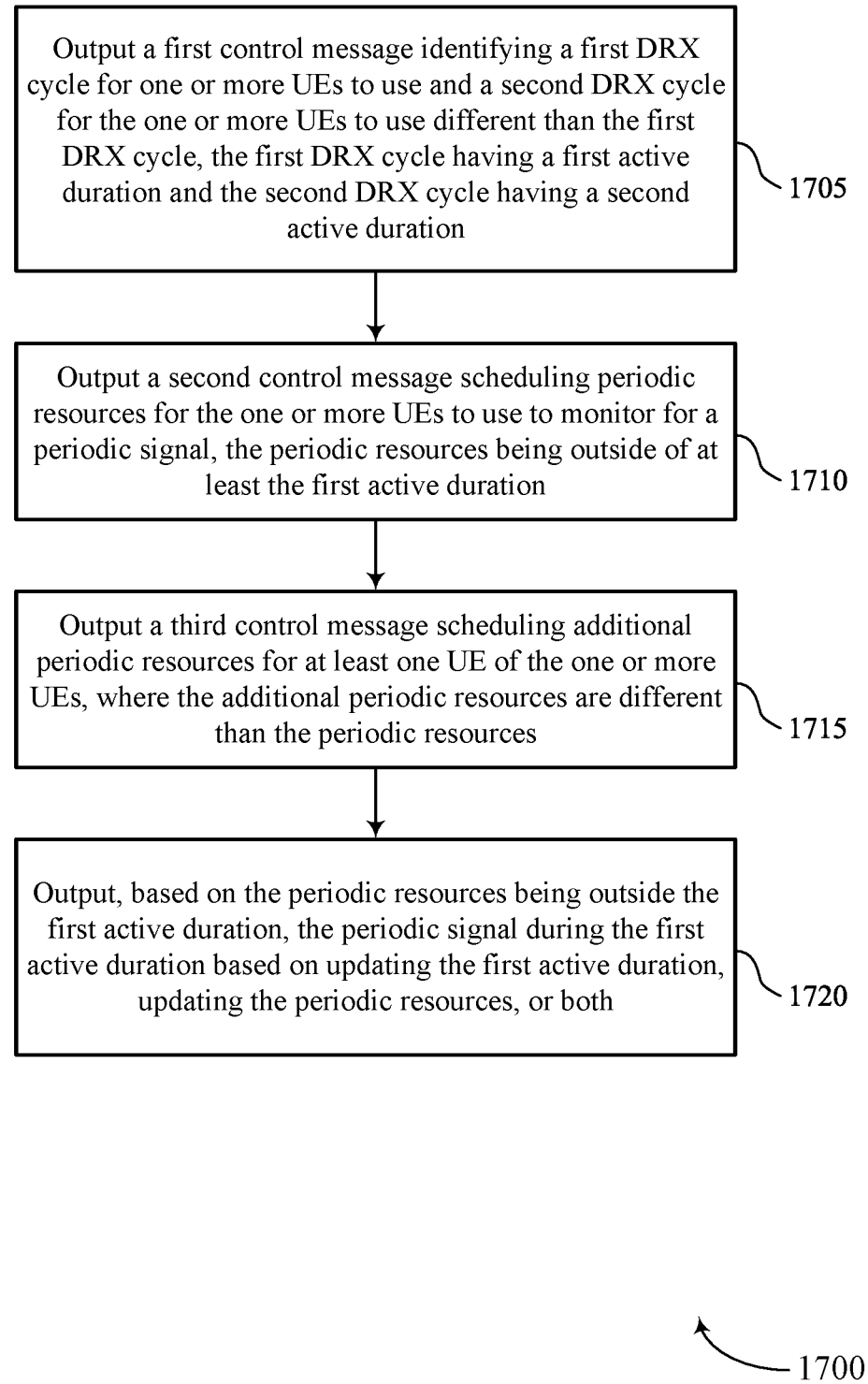

FIG. 17 shows a flowchart illustrating a method 1700 that supports monitoring for periodic signals during non-uniform DRX cycles in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting a first control message identifying a first DRX cycle for one or more UEs to use and a second DRX cycle for the one or more UEs to use different than the first DRX cycle, the first DRX cycle having a first active duration and the second DRX cycle having a second active duration. The operations of 1705 may be performed in accordance with examples as disclosed herein. In some examples, aspects of the operations of 1705 may be performed by a message output manager 1225 as described with reference to FIG. 12.

At 1710, the method may include outputting a second control message scheduling periodic resources for the one or more UEs to use to monitor for a periodic signal, the periodic resources being outside of at least the first active duration. The operations of 1710 may be performed in accordance with examples as disclosed herein. In some examples, aspects of the operations of 1710 may be performed by a message output manager 1225 as described with reference to FIG. 12.

At 1715, the method may include outputting a third control message scheduling additional periodic resources for at least one UE of the one or more UEs, where the additional periodic resources are different than the periodic resources. The operations of 1715 may be performed in accordance with examples as disclosed herein. In some examples, aspects of the operations of 1715 may be performed by a message output manager 1225 as described with reference to FIG. 12.

At 1720, the method may include outputting, based on the periodic resources being outside the first active duration, the periodic signal during the first active duration based on updating the first active duration, updating the periodic resources, or both. The operations of 1720 may be performed in accordance with examples as disclosed herein. In some examples, aspects of the operations of 1720 may be performed by a periodic signal output manager 1230 as described with reference to FIG. 12.

The following provides an overview of aspects of the present disclosure:

Aspect 1: A method for wireless communication at a UE, comprising: receiving a first control message identifying a first discontinuous reception cycle for the UE to use and a second discontinuous reception cycle for the UE to use different than the first discontinuous reception cycle, the first discontinuous reception cycle having a first active duration and the second discontinuous reception cycle having a second active duration; receiving a second control message identifying periodic resources for the UE to use to monitor for a periodic signal, the periodic resources being outside at least the first active duration; and monitoring, based at least in part on the periodic resources being outside the first active duration, for the periodic signal during the first active duration based at least in part on updating the first active duration, updating the periodic resources, or both.

Aspect 2: The method of aspect 1, further comprising: receiving an indication for the UE to update the periodic resources for the periodic signal to overlap the first active duration.

Aspect 3: The method of any of aspects 1 through 2, further comprising: receiving, according to a period derived from a fraction of two integers, one or more indications for updating the periodic resources, wherein the first control message is received according to the period.

Aspect 4: The method of any of aspects 1 through 3, further comprising: receiving an indication for updating the periodic resources, wherein the indication is received via the first control message and the first control message comprises a wakeup signal, a downlink control information message, a medium access control-control element, or any combination thereof.

Aspect 5: The method of any of aspects 1 through 4, further comprising: receiving an indication of a relationship between the first discontinuous reception cycle and the periodic resources, wherein the relationship corresponds to a period of the periodic resources, a start time of the first discontinuous reception cycle, the first active duration, a time difference between the periodic resources and the first active duration, or any combination thereof and updating the first active duration, updating the periodic resources or both in accordance with the relationship between the first discontinuous reception cycle and the periodic resources.

Aspect 6: The method of any of aspects 1 through 5, further comprising: receiving an indication of an update to the first active duration, wherein updating the first active duration comprises starting a third active duration for the periodic resources in accordance with the indication or extending the first active duration for the periodic resources in accordance with the indication.

Aspect 7: The method of any of aspects 1 through 6, further comprising: receiving an indication to monitor during the first active duration and a third active duration, wherein the first discontinuous reception cycle is a two-stage discontinuous reception cycle with the first active duration and the third active duration; and updating the first active duration to include the first active duration and the third active duration.

Aspect 8: The method of any of aspects 1 through 7, further comprising: refraining from monitoring for the periodic signal during the second active duration based at least in part on the periodic resources being outside of the second active duration; and transmitting an indication that the UE is refraining from monitoring for the periodic signal to a network entity.

Aspect 9: The method of any of aspects 1 through 8, wherein the periodic resources for the UE to use to monitor for the periodic signal comprise one or more of a channel state information-reference signal resource, a search space set, a semi-persistent scheduling resource, a configured grant resource, or a sounding reference signal resource.

Aspect 10: The method of any of aspects 1 through 9, wherein the periodic resources correspond to a period associated with an integer value, one or more rational numbers, a timing reference value corresponding to a system frame number, or any combination thereof.

Aspect 11: A method for wireless communication at a network entity, comprising: outputting a first control message identifying a first discontinuous reception cycle for one or more user equipments (UEs) to use and a second discontinuous reception cycle for the one or more UEs to use different than the first discontinuous reception cycle, the first discontinuous reception cycle having a first active duration and the second discontinuous reception cycle having a second active duration; outputting a second control message scheduling periodic resources for the one or more UEs to use to monitor for a periodic signal, the periodic resources being outside of at least the first active duration; and outputting, based at least in part on the periodic resources being outside the first active duration, the periodic signal during the first active duration based at least in part on updating the first active duration, updating the periodic resources, or both.

Aspect 12: The method of aspect 11, wherein the updating the periodic resources comprises: outputting a third control message scheduling additional periodic resources for at least one UE of the one or more UEs, wherein the additional periodic resources are different than the periodic resources.

Aspect 13: The method of any of aspects 11 through 12, further comprising: outputting an indication for at least one UE of the one or more UEs to update the periodic resources for the periodic signal to overlap the first active duration.

Aspect 14: The method of any of aspects 11 through 13, further comprising: outputting, according to a period derived from a fraction of two integers, one or more indications for updating the periodic resources, wherein the first control message is output according to the period.

Aspect 15: The method of any of aspects 11 through 14, further comprising: outputting an indication for updating the periodic resources, wherein the indication is output via the first control message and the first control message comprises a wakeup signal, a downlink control information message, a medium access control-control element, or any combination thereof.

Aspect 16: The method of any of aspects 11 through 15, further comprising: outputting an indication of a relationship between the first discontinuous reception cycle and the periodic resources, wherein the relationship corresponds to a period of the periodic resources, a start time of the first discontinuous reception cycle, the first active duration, a time difference between the periodic resources and the first active duration, or any combination thereof.

Aspect 17: The method of any of aspects 11 through 16, further comprising: outputting an indication of an update to the first active duration, wherein the update to the first active duration comprises starting a third active duration for the periodic resources in accordance with the indication or extending the first active duration for the periodic resources in accordance with the indication.

Aspect 18: The method of any of aspects 11 through 17, further comprising: outputting an indication to monitor during the first active duration and a third active duration, wherein the first discontinuous reception cycle is a two-stage discontinuous reception cycle with the first active duration and the third active duration.

Aspect 19: The method of any of aspects 11 through 18, further comprising: obtaining an indication that at least one UE of the one or more UEs is refraining from monitoring for the periodic signal.

Aspect 20: The method of any of aspects 11 through 19, wherein the periodic resources for the one or more UEs to use to monitor for the periodic signal comprise one or more of a channel state information-reference signal resource, a search space set, a semi-persistent scheduling resource, a configured grant resource, or a sounding reference signal resource.

Aspect 21: The method of any of aspects 11 through 20, wherein the periodic resources correspond to a period associated with an integer value, one or more rational numbers, a timing reference value corresponding to a system frame number, or any combination thereof.

Aspect 22: An apparatus for wireless communication at a UE, comprising a processor; memory coupled with the processor; and instructions stored in the memory and executable by the processor to cause the apparatus to perform a method of any of aspects 1 through 10.

Aspect 23: An apparatus for wireless communication at a UE, comprising at least one means for performing a method of any of aspects 1 through 10.

Aspect 24: A non-transitory computer-readable medium storing code for wireless communication at a UE, the code comprising instructions executable by a processor to perform a method of any of aspects 1 through 10.

Aspect 25: An apparatus for wireless communication at a network entity, comprising a processor; memory coupled with the processor; and instructions stored in the memory and executable by the processor to cause the apparatus to perform a method of any of aspects 11 through 21.

Aspect 26: An apparatus for wireless communication at a network entity, comprising at least one means for performing a method of any of aspects 11 through 21.

Aspect 27: A non-transitory computer-readable medium storing code for wireless communication at a network entity, the code comprising instructions executable by a processor to perform a method of any of aspects 11 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first control message identifying a first discontinuous reception cycle for the UE to use and a second discontinuous reception cycle for the UE to use different than the first discontinuous reception cycle, the first discontinuous reception cycle having a first active duration and the second discontinuous reception cycle having a second active duration;
   receiving a second control message identifying periodic resources for the UE to use to monitor for a periodic signal, the periodic resources being outside at least the first active duration;
   monitoring, based at least in part on the periodic resources being outside the first active duration, for the periodic signal during the first active duration based at least in part on updating the first active duration, updating the periodic resources, or both; and
   receiving an indication for the UE to update the periodic resources for the periodic signal to overlap the first active duration.

2. The method of claim 1, further comprising:
   receiving, according to a period derived from a fraction of two integers, one or more indications for updating the periodic resources, wherein the first control message is received according to the period.

3. The method of claim 1, further comprising:
   receiving an indication for updating the periodic resources, wherein the indication is received via the first control message and the first control message comprises a wakeup signal, a downlink control information message, a medium access control-control element, or any combination thereof.

4. The method of claim 1, further comprising:
   receiving an indication of a relationship between the first discontinuous reception cycle and the periodic resources, wherein the relationship corresponds to a period of the periodic resources, a start time of the first discontinuous reception cycle, the first active duration, a time difference between the periodic resources and the first active duration, or any combination thereof; and
   updating the first active duration, updating the periodic resources, or both in accordance with the relationship between the first discontinuous reception cycle and the periodic resources.

5. The method of claim 1, further comprising:
   receiving an indication of an update to the first active duration, wherein updating the first active duration comprises starting a third active duration for the periodic resources in accordance with the indication or extending the first active duration for the periodic resources in accordance with the indication.

6. The method of claim 1, further comprising:
   receiving an indication to monitor during the first active duration and a third active duration, wherein the first discontinuous reception cycle is a two-stage discontinuous reception cycle with the first active duration and the third active duration; and
   updating the first active duration to include the first active duration and the third active duration.

7. The method of claim 1, further comprising:
refraining from monitoring for the periodic signal during the second active duration based at least in part on the periodic resources being outside of the second active duration; and
transmitting an indication that the UE is refraining from monitoring for the periodic signal to a network entity.

8. The method of claim 1, wherein the periodic resources for the UE to use to monitor for the periodic signal comprise one or more of a channel state information-reference signal resource, a search space set, a semi-persistent scheduling resource, a configured grant resource, or a sounding reference signal resource.

9. The method of claim 1, wherein the periodic resources correspond to a period associated with an integer value, one or more rational numbers, a timing reference value corresponding to a system frame number, or any combination thereof.

10. A method for wireless communication at a network entity, comprising:
outputting a first control message identifying a first discontinuous reception cycle for one or more user equipments (UEs) to use and a second discontinuous reception cycle for the one or more UEs to use different than the first discontinuous reception cycle, the first discontinuous reception cycle having a first active duration and the second discontinuous reception cycle having a second active duration;
outputting a second control message scheduling periodic resources for the one or more UEs to use to monitor for a periodic signal, the periodic resources being outside of at least the first active duration; and
outputting, based at least in part on the periodic resources being outside the first active duration, the periodic signal during the first active duration based at least in part on updating the first active duration, updating the periodic resources, or both; and
Outputting an indication for at least one UE of the one or more UEs to update the periodic resources for the periodic signal to overlap the first active duration.

11. The method of claim 10, wherein the updating the periodic resources comprises:
outputting a third control message scheduling additional periodic resources for at least one UE of the one or more UEs, wherein the additional periodic resources are different than the periodic resources.

12. The method of claim 10, further comprising:
outputting, according to a period derived from a fraction of two integers, one or more indications for updating the periodic resources, wherein the first control message is output according to the period.

13. The method of claim 10, further comprising:
outputting an indication for updating the periodic resources, wherein the indication is output via the first control message and the first control message comprises a wakeup signal, a downlink control information message, a medium access control-control element, or any combination thereof.

14. The method of claim 10, further comprising:
outputting an indication of a relationship between the first discontinuous reception cycle and the periodic resources, wherein the relationship corresponds to a period of the periodic resources, a start time of the first discontinuous reception cycle, the first active duration, a time difference between the periodic resources and the first active duration, or any combination thereof.

15. The method of claim 10, further comprising:
outputting an indication of an update to the first active duration, wherein the update to the first active duration comprises starting a third active duration for the periodic resources in accordance with the indication or extending the first active duration for the periodic resources in accordance with the indication.

16. The method of claim 10, further comprising:
outputting an indication to monitor during the first active duration and a third active duration, wherein the first discontinuous reception cycle is a two-stage discontinuous reception cycle with the first active duration and the third active duration.

17. The method of claim 10, further comprising:
obtaining an indication that at least one UE of the one or more UEs is refraining from monitoring for the periodic signal.

18. The method of claim 10, wherein the periodic resources for the one or more UEs to use to monitor for the periodic signal comprise one or more of a channel state information-reference signal resource, a search space set, a semi-persistent scheduling resource, a configured grant resource, or a sounding reference signal resource.

19. The method of claim 10, wherein the periodic resources correspond to a period associated with an integer value, one or more rational numbers, a timing reference value corresponding to a system frame number, or any combination thereof.

20. An apparatus for wireless communication at a user equipment (UE), comprising:
a processor;
memory coupled with the processor; and
instructions stored in the memory and executable by the processor to cause the apparatus to:
receive a first control message identifying a first discontinuous reception cycle for the UE to use and a second discontinuous reception cycle for the UE to use different than the first discontinuous reception cycle, the first discontinuous reception cycle having a first active duration and the second discontinuous reception cycle having a second active duration;
receive a second control message identifying periodic resources for the UE to use to monitor for a periodic signal, the periodic resources being outside at least the first active duration;
monitor, based at least in part on the periodic resources being outside the first active duration, for the periodic signal during the first active duration based at least in part on updating the first active duration, updating the periodic resources, or both; and
receive an indication for the UE to update the periodic resources for the periodic signal to overlap the first active duration.

21. The apparatus of claim 20, wherein the instructions are further executable by the processor to cause the apparatus to:
receive, according to a period derived from a fraction of two integers, one or more indications for updating the periodic resources, wherein the first control message is received according to the period.

22. The apparatus of claim 20, wherein the instructions are further executable by the processor to cause the apparatus to:
receive an indication for updating the periodic resources, wherein the indication is received via the first control message and the first control message comprises a wakeup signal, a downlink control information message, a medium access control-control element, or any combination thereof.

23. The apparatus of claim 20, wherein the instructions are further executable by the processor to cause the apparatus to:
receive an indication of a relationship between the first discontinuous reception cycle and the periodic resources, wherein the relationship corresponds to a period of the periodic resources, a start time of the first discontinuous reception cycle, the first active duration, a time difference between the periodic resources and the first active duration, or any combination thereof; and
update the first active duration, updating the periodic resources, or both in accordance with the relationship between the first discontinuous reception cycle and the periodic resources.

24. The apparatus of claim 20, wherein the instructions are further executable by the processor to cause the apparatus to:
receive an indication of an update to the first active duration, wherein updating the first active duration comprises starting a third active duration for the periodic resources in accordance with the indication or extending the first active duration for the periodic resources in accordance with the indication.

25. The apparatus of claim 20, wherein the instructions are further executable by the processor to cause the apparatus to:
receive an indication to monitor during the first active duration and a third active duration, wherein the first discontinuous reception cycle is a two-stage discontinuous reception cycle with the first active duration and the third active duration; and
update the first active duration to include the first active duration and the third active duration.

26. An apparatus for wireless communication at a network entity, comprising:
a processor;
memory coupled with the processor; and
instructions stored in the memory and executable by the processor to cause the apparatus to:
output a first control message identifying a first discontinuous reception cycle for one or more user equipments (UEs) to use and a second discontinuous reception cycle for the one or more UEs to use different than the first discontinuous reception cycle, the first discontinuous reception cycle having a first active duration and the second discontinuous reception cycle having a second active duration;
output a second control message scheduling periodic resources for the one or more UEs to use to monitor for a periodic signal, the periodic resources being outside of at least the first active duration;
output, based at least in part on the periodic resources being outside the first active duration, the periodic signal during the first active duration based at least in part on updating the first active duration, updating the periodic resources, or both; and
Outputting an indication for at least one UE of the one or more UEs to update the periodic resources for the periodic signal to overlap the first active duration.

27. The apparatus of claim 26, wherein the instructions to update the periodic resources are executable by the processor to cause the apparatus to:
output a third control message scheduling additional periodic resources for at least one UE of the one or more UEs, wherein the additional periodic resources are different than the periodic resources.

* * * * *